United States Patent
Kosuge et al.

(10) Patent No.: US 6,941,645 B2
(45) Date of Patent: Sep. 13, 2005

(54) AUTOMATIC PISTON INSERTING EQUIPMENT USING A VISION SYSTEM

(75) Inventors: Kazuhiro Kosuge, 21-10, Yakata 3-chome, Izumi-ku, Sendai-shi, Miyagi-ken (JP); Katsuyoshi Tachibana, Tokyo (JP); Yuichiro Ueda, Tokyo (JP); Takenori Hirakawa, Tokyo (JP)

(73) Assignees: Kazuhiro Kosuge (JP); Hirata Corporation (JP)

( * ) Notice: Subject to any disclaimer, the term of this patent is extended or adjusted under 35 U.S.C. 154(b) by 0 days.

(21) Appl. No.: 10/405,340

(22) Filed: Apr. 3, 2003

(65) Prior Publication Data

US 2004/0194296 A1 Oct. 7, 2004

Related U.S. Application Data

(63) Continuation-in-part of application No. 09/802,900, filed on Mar. 12, 2001, now Pat. No. 6,680,237.

(51) Int. Cl.[7] ............................................. B23P 21/00
(52) U.S. Cl. ........................... 29/714; 29/703; 29/721; 29/407.04; 29/407.09; 29/888.01; 29/888.044; 700/253; 700/259
(58) Field of Search .......................... 29/714, 703, 720, 29/721, 822, 888, 888.01, 888.04, 407.04, 407.09, 407.01, 222, 269, 88.01; 700/12, 253, 259

(56) References Cited

U.S. PATENT DOCUMENTS

| | | | | |
|---|---|---|---|---|
| 3,793,718 A | * | 2/1974 | Okazaki | 29/256 |
| 3,813,755 A | * | 6/1974 | Maskell et al. | 29/252 |
| 5,519,937 A | * | 5/1996 | Soriano et al. | 29/842 |
| 6,038,767 A | * | 3/2000 | Ito | 29/888.02 |
| 6,047,472 A | * | 4/2000 | Koch et al. | 29/888.01 |
| 6,138,340 A | * | 10/2000 | Yoshida | 29/468 |
| 6,141,863 A | * | 11/2000 | Hara et al. | 29/714 |
| 6,367,141 B1 | * | 4/2002 | Cook et al. | 29/407.1 |
| 6,467,155 B1 | * | 10/2002 | Cook et al. | 29/714 |
| 6,516,511 B1 | * | 2/2003 | Cook et al. | 29/720 |
| 6,591,484 B2 | * | 7/2003 | Cook et al. | 29/709 |
| 6,591,485 B2 | * | 7/2003 | Cappa et al. | 29/714 |
| 6,658,713 B1 | * | 12/2003 | Wittum et al. | 29/267 |
| 6,687,993 B1 | * | 2/2004 | Bertin et al. | 29/888.044 |
| 6,763,283 B1 | * | 7/2004 | Murakami | 700/259 |
| 6,871,393 B2 | * | 3/2005 | Kim | 29/714 |
| 6,886,231 B2 | * | 5/2005 | Lawson et al. | 29/407.01 |
| 6,886,241 B2 | * | 5/2005 | Tachibana et al. | 29/791 |
| 2004/0167671 A1 | * | 8/2004 | Aoyuama | 700/259 |
| 2005/0049751 A1 | * | 3/2005 | Farnworth | 700/259 |

FOREIGN PATENT DOCUMENTS

JP 06226561 A * 8/1994 ........... B23P/19/06

* cited by examiner

*Primary Examiner*—Essama Omgba
(74) *Attorney, Agent, or Firm*—Lorusso, Loud & Kelly

(57) ABSTRACT

An automatic piston inserting equipment comprises a block positioning means for positioning a cylinder block B to a piston inserting position, a piston positioning means for moving and positioning a piston P with a connecting rod R for insertion thereof into a cylinder bore formed in the cylinder block B vertically from above, a cap positioning means for moving and positioning a connecting rod cap C to clamp it vertically from below to the connecting rod R inserted into the cylinder bore, a damp means for damping the connecting rod cap C to the connecting rod R, and a vision system. The vision system detects central position coordinates of the cylinder bore lying at the piston inserting position and central position coordinates of the piston P lying at a start-point chuck position, and on the basis of both such central position coordinates calculates a movement quantity for insertion of the piston P into the cylinder bore.

3 Claims, 16 Drawing Sheets

AUTOMATIC PISTON INSERTING EQUIPMENT USING A VISION SYSTEM

CROSS REFERENCE TO RELATED APPLICATIONS

The present application is a continuation-in-part of copending application Ser. No. 09/802,900 filed Mar. 12, 2001, pending, and a benefit thereof is claimed under 35 USC 120. The present application also claims benefit, under 35 USC 119, of Japanese Application No. 2000-117153 filed Mar. 15, 2000 and Japanese Application Ser. No. 2001-040832 filed Feb. 16, 2001.

BACKGROUND OF THE INVENTION

1. Field of the Invention

The present invention relates to an automatic piston inserting apparatus to be used for automatically inserting a piston assembly, which is a combination of a piston, a piston ring, and a connecting rod, into a cylinder bore formed in a cylinder block, in assembling a V type or in-line type automobile engine. Particularly, the invention is concerned with an automatic piston inserting apparatus using a vision system for determining an increment of movement of a piston, which apparatus aligns a piston with a cylinder bore and inserts the piston into the cylinder bore efficiently, in a short time, and which has a relatively simple construction and can cope with various sizes of pistons without reconstruction or a procedure changing work.

2. Description of the Prior Art

Heretofore, in an automatic piston inserting equipment, teaching operation is conducted for teaching both the position in which a piston has been taken out and the position of the associated cylinder bore to an NC transfer system. However, if there are variations in the positioning accuracy of a cylinder block in which the cylinder bore is formed or in the dimensional accuracy of the work itself, the piston may be caught in the cylinder bore when inserted or the piston and the cylinder bore may be damaged.

Heretofore, when a piston is to be inserted into a cylinder bore and fitting of the two is to be effected using a machine such as a robot, there has been adopted a method using a jig for the insertion or a method wherein the position of the cylinder bore is detected with use of a vision system (a two-dimensional camera), to eliminate a discrepancy between the position of the cylinder bore and the current position of the piston.

For example, in the case where an insertion jig is used (Japanese Patent Laid Open No. 115129/1984), as shown in FIG. 16(a), an insertion jig 01 has an inlet larger than an insertion bore (cylinder bore) 02. From this inlet the insertion jig 01 is tapered or gently curved, leading to an outlet (insertion port) which is positioned on the side opposite to the inlet and which is of the same shape as an inlet portion of the insertion bore 02.

The insertion jig 01 of such a shape is first placed on an opening portion of the insertion bore 02 formed in an object (cylinder block) 05 which has the insertion bore 02 in such a manner that both axes approach each other as close as possible. At this stage, the axis of the insertion jig 01 and that of the insertion bore 02 are not coincident with each other. In this state, an expanding device 03 having plural fingers adapted to be expanded from inside toward outside is inserted into the insertion bore 02 and the plural fingers are expanded outwards, with the result that the insertion jig 01 moves into alignment with the insertion bore 02 (see FIG. 16(b)). In this state the insertion jig 01 is fixed to prevent its movement.

Next, a to-be-inserted object (piston) 04 is pushed in toward the insertion bore 02 while allowing it to follow the taper shape of the insertion jig 01, whereby it is inserted into the insertion bore 02 through the outlet of the insertion jig 01 (see FIG. 16(c)).

However, in such a conventional method using the insertion jig 01, it is necessary to use the insertion jig 01 which conforms to the shape of the insertion bore, and hence it is necessary to provide insertion jigs 01 in a number corresponding to the number of various type of bores. Besides, it becomes necessary to provide means for switching from one insertion jig to another, with consequent complication of operation and increase of cycle time. Further, the expanding device 03 is also needed, and an extra work time is required for an alignment work using the expanding device. Additionally, the jig is originally required to be machined highly accurately and have durability and is expensive. Under these circumstances, in a multi-variety mixed production line for various types of products exceeding three types, the application of the method using the insertion jig 01 is difficult. For this reason, for example in many engine assembling lines as multi-variety mixed production lines, the piston inserting step for a cylinder bore is carried out by a manual operation.

As another method using a jig there is known a method in which a position detecting jig is moved and the position of an insertion bore is detected while making search and trace with use of force control (Japanese Patent Laid Open No. 256526/1992). In this method, however, a to-be-inserted object chucking/inserting device is required to shift jig-part chucking portions from one to the other, thus taking time and causing an error as a result of repeating the said shifting motion many times. As method utilizing a similar trace means there is known a method in which the position of an insertion bore is detected while a to-be-inserted object itself is allowed to contact and follow an insertion bore (Japanese Patent Laid Open Nos. 108108/1993 and 168927/1996). However, both methods involve the problem of damage to parts for example because the to-be-inserted object itself is contacted with the insertion bore to detect the position of the bore.

In the case where a vision system is used, an offset between a piston and a cylinder bore is detected by means of a camera, position data of a piston chucking/conveying robot are corrected, and in a correct robot position the piston is pushed into the cylinder bore. Heretofore, the camera is relatively expensive and has been a cause of cost increase. Besides, the accuracy of the measurement by the camera does not become higher than the resolution thereof, so for detecting the bore position with a high accuracy it is necessary to see the bore in a close-up state. In the case of a large bore, three or more cameras are needed, and thus an attempt to increase the accuracy leads to a further increase of cost.

SUMMARY OF THE INVENTION

It is an object of the present invention to solve the above-mentioned problems of the conventional equipment for inserting a piston into a cylinder bore in alignment with each other and provide an automatic piston inserting equipment not using a jig for the alignment between a piston and a cylinder bore but using a camera for detecting the positions of the piston and cylinder bore which camera has recently been remarkably improved in performance and become moderate in price, thereby permitting, with a relatively simple construction, the insertion of a piston into a cylinder bore in a short time with a high working efficiency, and capable of handling various sizes of pistons without reconstruction or a procedure changing work.

The present invention is concerned with an automatic piston inserting equipment using a vision system which has solved the above-mentioned problems.

In a first aspect of the present invention there is provided an automatic piston inserting apparatus using a vision system for inserting a piston with a connecting rod into a cylinder bore formed in a cylinder block provided with a crank shaft, clamping a connecting rod cap to the connecting rod and connecting the piston to the crank shaft, the automatic piston inserting apparatus comprising block positioning means for moving the cylinder block in both vertical and horizontal directions or rotating the cylinder block around the crank shaft to position the cylinder block at a predetermined position; piston positioning means for positioning the piston for insertion thereof vertically from above into the cylinder bore formed in the cylinder block positioned by the block positioning means; cap positioning means for positioning the connecting rod cap for clamping it vertically from below to the connecting rod of the piston inserted into the cylinder bore; a clamp means for clamping the connecting rod cap vertically from below to the connecting rod; and a vision system, wherein the vision system photographs an image of the cylinder bore formed in the cylinder block positioned by the block positioning means and an image of the piston at a start-point chuck position, calculates central position coordinates of the cylinder bore and central position coordinates of the piston from image data obtained, and calculates from both such central position coordinates an increment of movement of the piston for insertion thereof into the cylinder bore, and on the basis of the increment of movement thus calculated, the piston positioning means moves the piston to a piston inserting position.

According to this construction, a central position of the cylinder bore concerned in the cylinder block positioned by the block positioning means and a central position of the piston positioned to the start-point chuck position are detected using the vision system, then a movement quantity of the piston for insertion thereof into the cylinder bore is calculated, and a movement quantity of the piston positioning means from the start point chuck position of the piston up to the position of the cylinder bore is determined. By so doing, even if there are variations in the positioning accuracy of the cylinder block or in the positioning accuracy of a piston assembly (an assembly of piston, piston ring, and connecting rod) or in the dimensional accuracy of the work itself, the automatic piston inserting equipment of the present invention corrects the position of the cylinder bore and that of the piston automatically, so that the piston can be automatically inserted into the cylinder bore positively with a high accuracy.

Besides, it is no longer required to separately provide a piston inserting jig unit, nor is it necessary to provide a jig floating means, a jig alignment means and a jig size switching means, further, it becomes unnecessary to provide jigs corresponding to various piston sizes, thus permitting the reduction of cost.

Moreover, since the mounting of the piston and that of the connecting rod cap can all be done automatically by adopting the block positioning means, piston positioning means, cap positioning means, clamp means, and vision system, it is possible to greatly improve the productivity in engine assembly.

Additionally, since all of cylinder bores can be oriented in the piston inserting direction by the block positioning means, the mounting of piston can be done automatically for not only in-line engines but also plural different types of engines, including V engines.

In a second aspect of the present invention there is provided, in combination with the above first aspect, an automatic piston inserting apparatus using a vision system, wherein the piston positioning means includes a holding unit which holds the piston and the connecting rod cap, both having been conveyed by a conveyance line which moves them horizontally for positioning; a piston chucking/inserting unit which chucks the piston held by the holding unit and moves it vertically; and a moving unit which moves the piston chucking/inserting unit a predetermined distance horizontally, allows the vision system to photograph an image of the piston, then moves the piston chucking/inserting unit horizontally by only the increment of movement determined by calculation in the vision system, and positions it at a predetermined position within a work area.

According to this construction, the holding unit separates from the conveyance line the piston and the connecting rod cap which have been conveyed along the conveyance line, positions them at a predetermined horizontal position, the piston chucking/inserting unit chucks the piston lying at the predetermined position and positions it at a predetermined vertical position, and the moving unit moves the piston chucking/inserting unit horizontally a predetermined distance, allows the vision system to photograph an image of the piston, then moves the piston chucking/inserting unit horizontally by the increment of movement determined by calculation in the vision system, and positions it at a predetermined position (piston inserting position) within a work area. Thus, since the holding of the piston, chucking of the piston, and the positioning of the piston at the predetermined position are performed by the respective units, a series of operations is carried out smoothly with a high accuracy.

In a third aspect of the present invention there is provided, in combination with the above second aspect, an automatic piston inserting apparatus using a vision system, wherein the piston chucking/inserting unit has three or more chuck fingers, the chuck fingers being circumferentially spaced and radially movable forward and backward, inside faces of the chuck fingers being formed as chuck faces for chucking the piston, outside faces of the chuck fingers being inwardly tapered, at least at respective tip portions, for contacting an inlet of the cylinder bore, and wherein the piston chucking/inserting unit further has a push mechanism for pushing the piston toward the cylinder bore.

According to this construction, since the inside faces of the three or more, plural chuck fingers arranged spacedly in the circumferential direction are formed as piston chucking faces, it follows that a piston ring compressing function is obtained at the same time. Besides, the outside faces of those chuck fingers are in a generally conical shape, which is suitable for contact with a chamfered portion usually formed in an inlet of the cylinder bore. Consequently, when the piston is inserted into the cylinder bore, the piston can be guided toward the cylinder bore, thus permitting the insertion thereof to be done smoothly.

Moreover, since the insertion of the piston into the cylinder bore is performed by the push mechanism provided in the piston chucking/inserting unit, it is no longer necessary to separately provide a push mechanism and hence the construction of the automatic piston inserting equipment is so much simplified. Further, the piston can be inserted into the cylinder bore in an aligned state in a short time with a high working efficiency, whereby the productivity in engine assembly can be improved to a greater extent.

Additionally, the three or more, plural chuck fingers are radially movable forward and backward, so by moving the chuck fingers radially forward and backward within their stroke and in conformity with the size of the piston concerned, it is made possible to chuck various sizes of pistons without reconstruction and a procedure changing work, thus permitting various sizes of pistons to be handled. Therefore, it is possible to provide an automatic piston inserting equipment suitable for a multi-variety mixed production line in engine assembly.

DETAILED DESCRIPTION OF A PREFERRED EMBODIMENT

An automatic piston inserting equipment using a vision system according to an embodiment of the present invention will be described hereinunder with reference to FIGS. 1 to 15.

Figure 1:
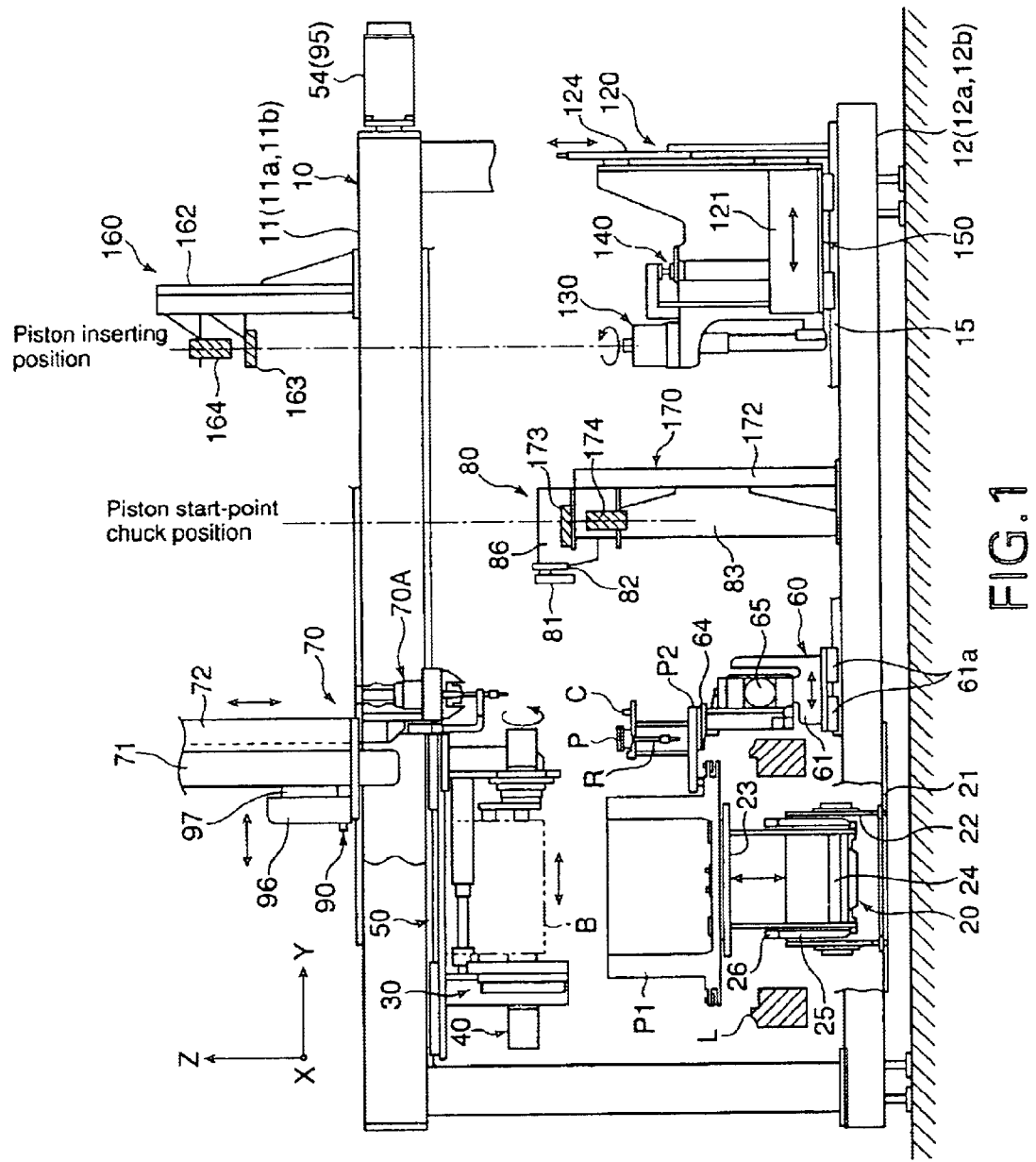
FIG. 1 is a front view showing a schematic construction of an automatic piston inserting equipment using a vision system according to an embodiment of the present invention.

As shown in FIG. 1, the automatic piston inserting equipment of this embodiment is provided with a gantry robot 10 of a frame structure adapted to set a relative positional relation of various units, a block lift unit 20 which holds a cylinder block B separately from a conveyance line L (e.g., linear conveyor), the cylinder block B being conveyed by the conveyance line L, a block chucking unit 30 which can chuck and rotate the cylinder block B held by the block lift unit 20, a shaft rotating unit 40 integral with the block chucking unit 30 to rotate a crank shaft, and a block moving unit 50 which moves the block chucking unit 30 in Y direction (horizontal direction) and positions it to a predetermined position.

The conveyance line L is adapted to convey together a pallet P1 for carrying the cylinder block B thereon and pallet P2 which is connected to the pallet P1 while carrying a piston P and a connecting rod cap C thereon.

As shown in FIG. 1, the automatic piston inserting equipment is also provided with a holding unit 60 capable of holding separately from the conveyance line L the piston P and the connecting rod cap C which have been conveyed together with the cylinder block B by the conveyance line L and capable of moving them suitably in X direction (a horizontal direction perpendicular to Y direction) to position them, a piston chucking/inserting unit 70 which not only chucks the piston P held by the holding unit 60 but also moves the piston in Z direction (vertical direction) and position it to a predetermined position, a cap chucking unit 80 which chucks the connecting rod cap C and moves it in Z direction, and a moving unit 90 which moves the piston chucking/inserting unit 70 in X-Y direction and positions it to a predetermined position.

Figure 2:
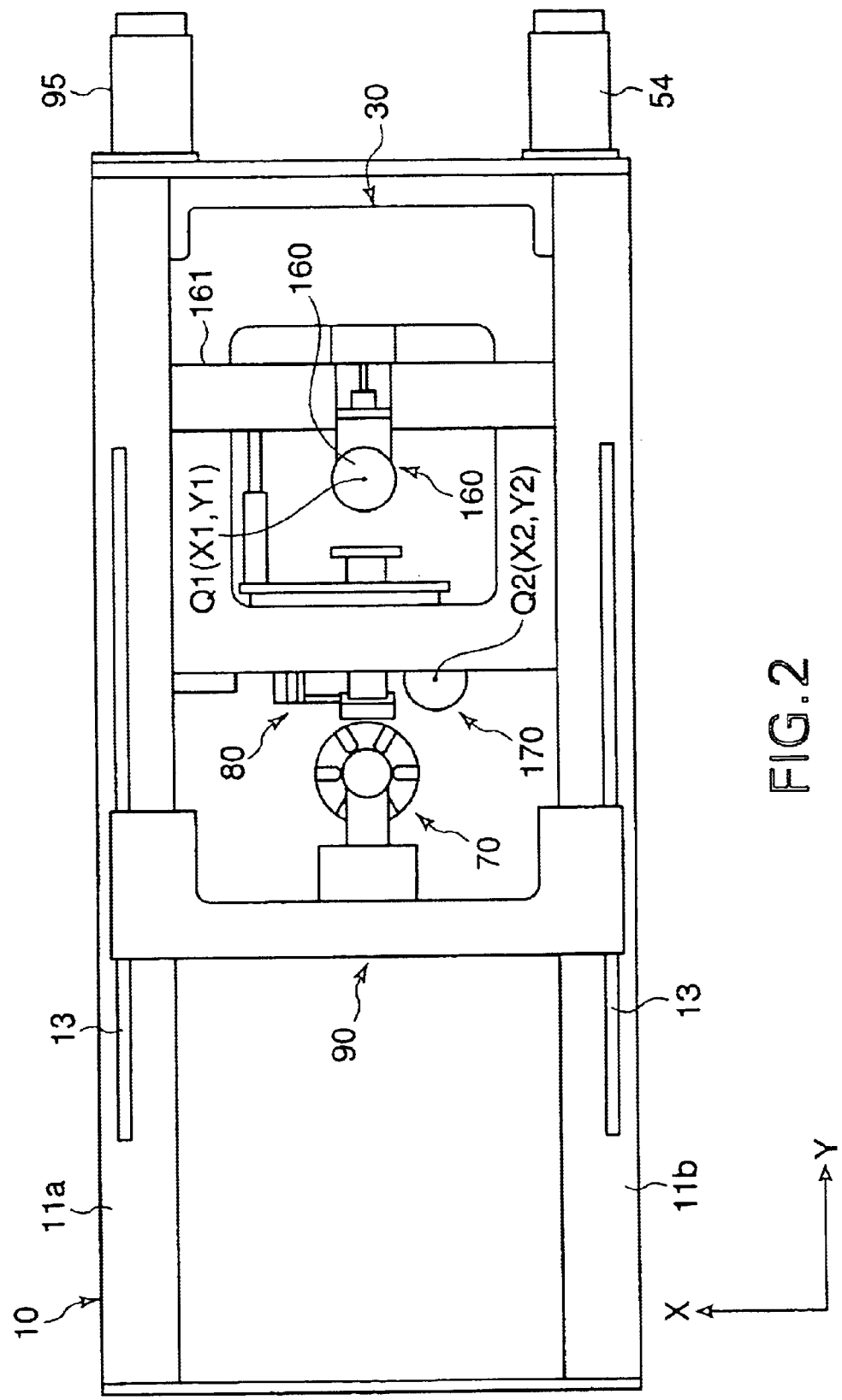
FIG. 2 is a plan view thereof.
Figure 7:
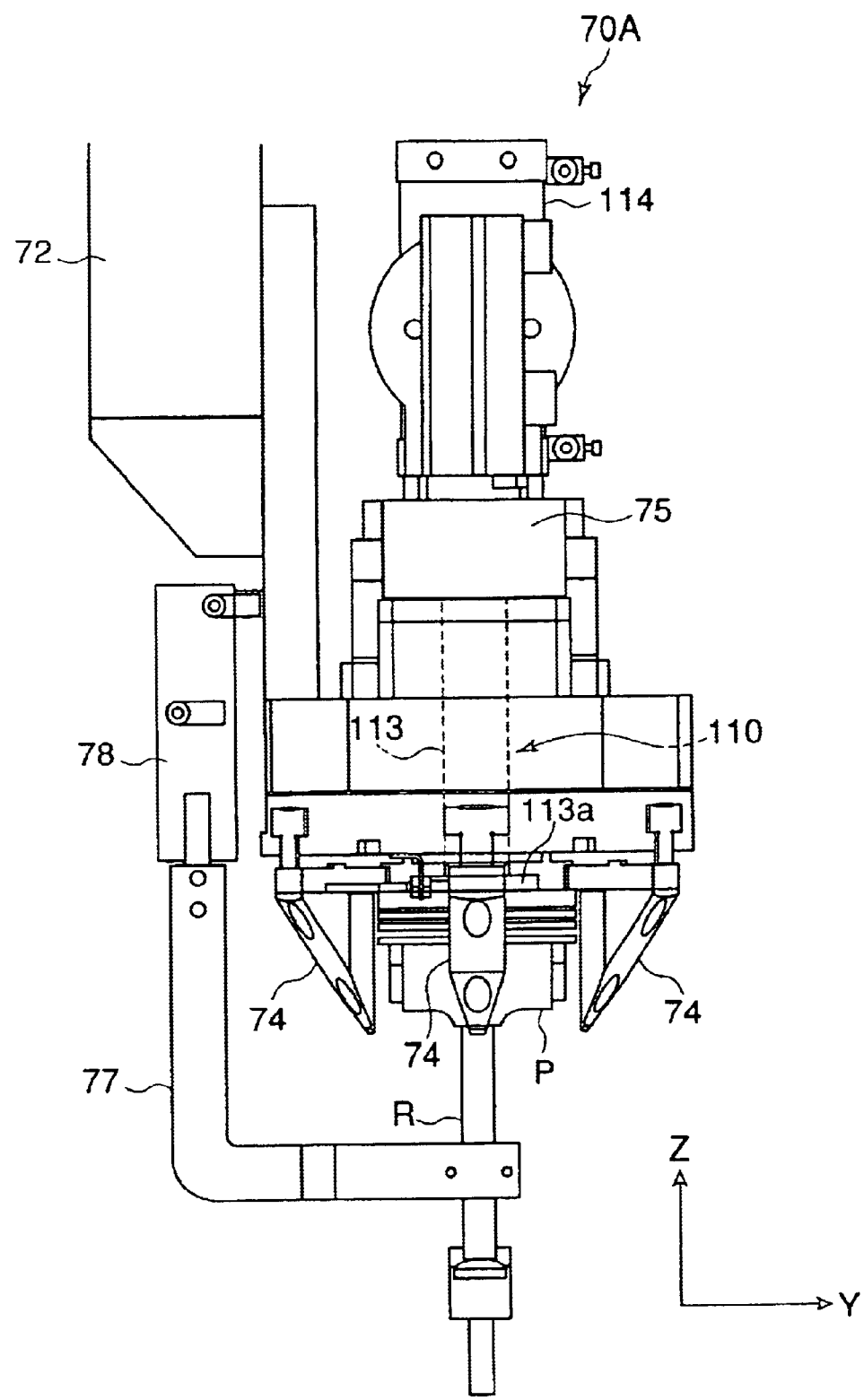
FIG. 7 is also a partial enlarged view of the piston chucking/inserting unit, showing a front of the piston chuck portion.

As shown in FIGS. 1, 2 and 7, the automatic piston inserting equipment is further provided with a piston position detecting unit 170 for detecting a planar position of the piston P held by the piston chucking/inserting unit 70, a cylinder bore position detecting unit 160 for detecting a planar position of a cylinder bore formed in the cylinder block B as positioned to a piston inserting position (the position where the piston P is to be inserted into the cylinder bore), a push mechanism 110 which pushes downward from above the piston P as guided by chuck fingers 74 of the piston chucking/inserting unit 70, a connecting rod guide unit 120 which guides, while descending, a connecting rod R of the piston P being pushed in by the push mechanism 110, a clamp unit 130 which not only holds the connecting rod cap C but also exerts a clamping force on a clamping bolt CB (FIG. 11), a clamp/lift unit 140 for moving the clamp unit 130 up and down, and a moving unit 150 which holds the clamp unit 130, clamp/lift unit 140 and connecting rod guide unit 120, moves them in Y direction and position them to predetermined positions.

As shown in FIG. 1, the gantry robot 10 includes upper frames 11 (11a, 11b) and lower frames 12 (12a, 12b), the upper and lower frames being arranged spacedly in parallel in Z direction. The gantry robot 10 is disposed at a suitable position of the conveyance line L which extends in X direction to support various units.

Figure 3A:
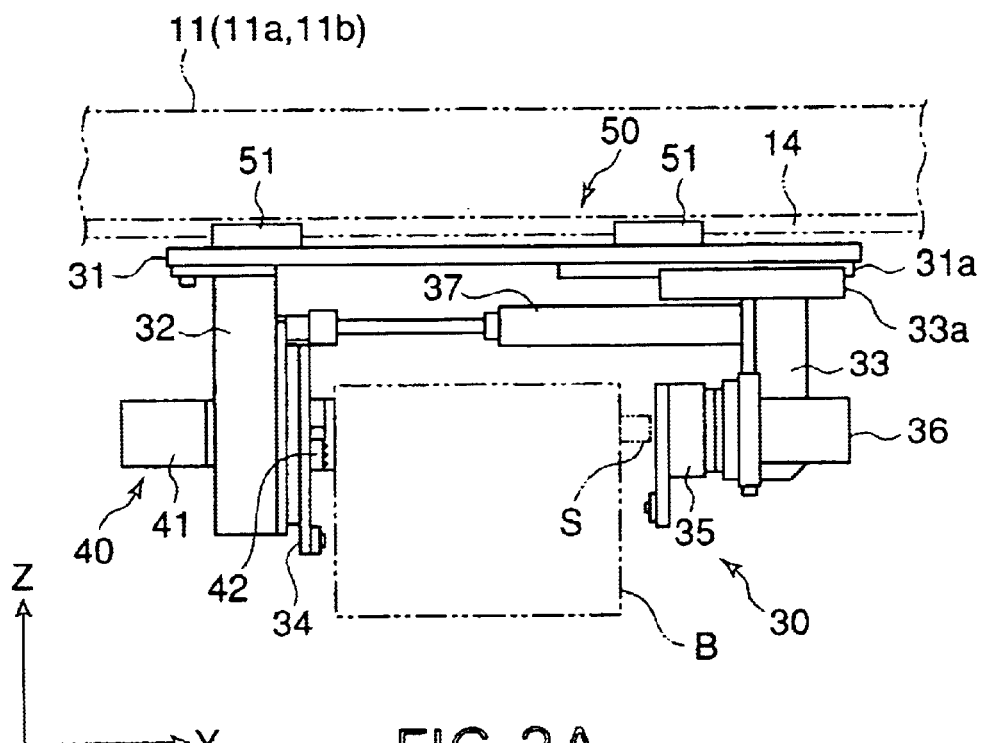
FIG. 3 illustrates some units which constitute the automatic piston inserting equipment, in which (a) is a front view showing a block chucking unit and (b) is a side view showing the block chucking unit, a block moving unit, and a piston moving unit.
Figure 3B:
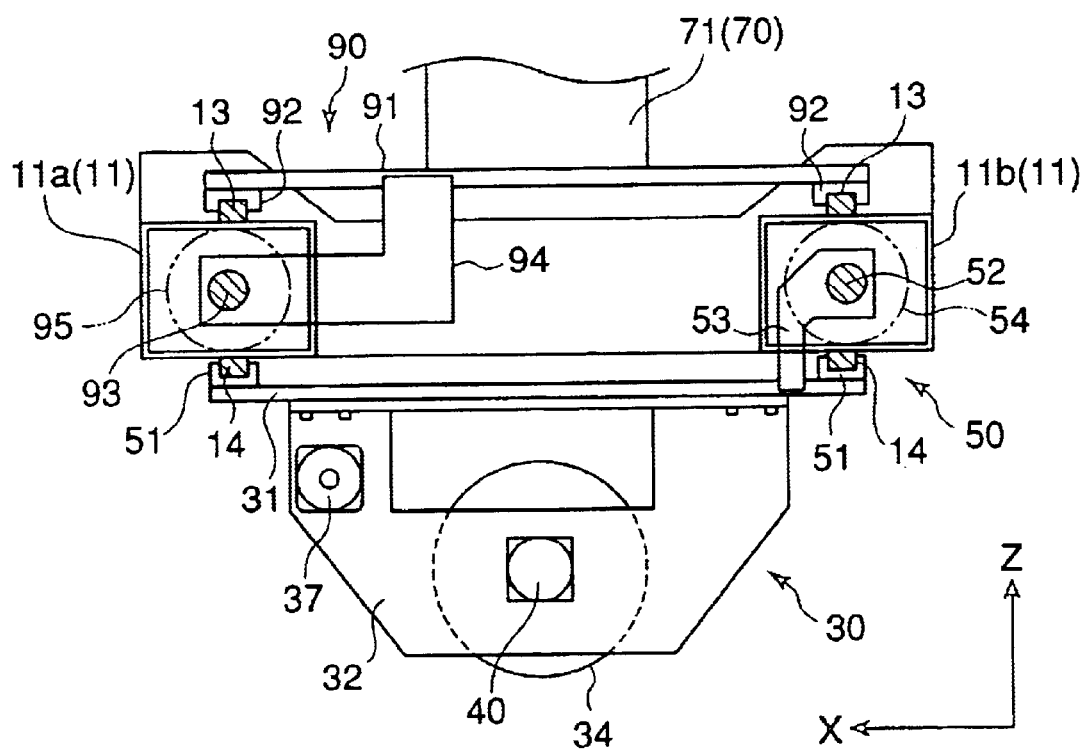

As shown in FIGS. 1 and 3(b), linear motion (hereinafter "LM") rails 13, extending in the Y direction to guide the moving unit 90, are provided on upper surfaces of the upper frames 11 (11a, 11b), while LM rails 14, extending in the Y direction to guide the block moving unit 50, are provided on lower surfaces of the upper frames 11. Thus, since conveyance paths (rails) are provided on upper and lower surfaces respectively of the upper frames 11, they can be more effectively utilized in comparison with the case where they are provided on separate frames, and the structure can be much simplified.

As shown in FIG. 3(b), in the interiors of the upper frames 11 (11a, 11b) and at end faces thereof are arranged a ball screw (lead screw) 93 and a drive motor 95 both constituting a part of the moving unit 90, as well as a ball screw (lead screw) 52 and a drive motor 54 both constituting a part of the block moving unit 50.

Figure 9:
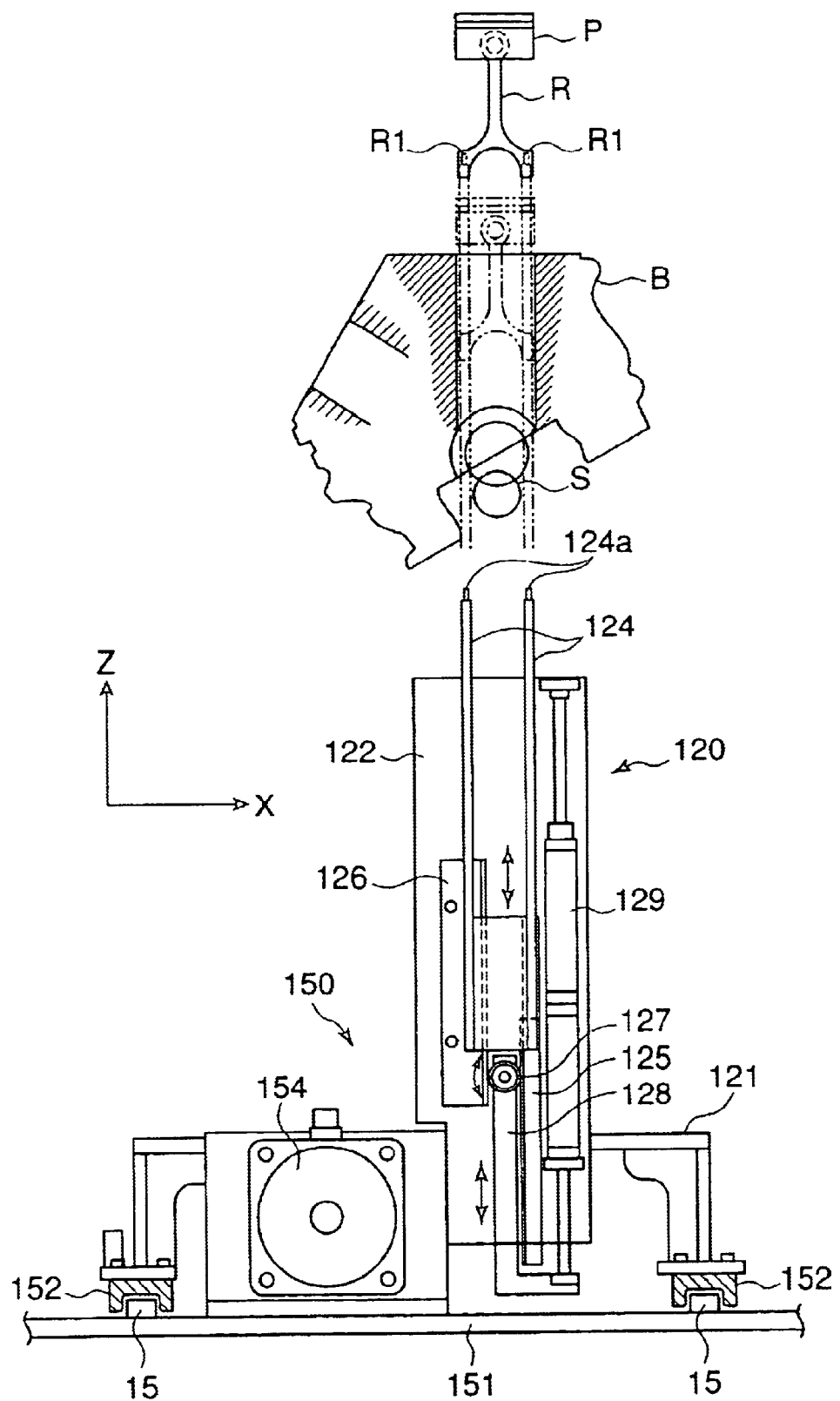
FIG. 9 is a side view showing a connecting rod guide unit and a moving unit.

A fixed base 151 (FIG. 9) spans the lower frames 12 (12a, 12b), and on the fixed base 151 are provided LM rails 15 which extend in Y direction to guide the holding unit 60 and the moving unit 150, as shown in FIGS. 1 and 9.

As shown in FIG. 1, the block lift unit 20 is disposed below the conveyance line L and comprises a base 22 fixed to a bed plate 21 which spans the lower frames 12 (12a, 12b), a lift table 23 which is guided vertically movably in Z direction relative to the base 22 and can support the pallet P1, a rotary shaft 24 supported rotatably by the base 22, an eccentric cam 25 fixed to the rotary shaft 24, a cam follower 26 fixed to a leg portion of the lift table 23, and a drive motor (not shown) which exerts a driving force on the rotary shaft 24.

According to this construction, when the pallet P2 which carries the piston P and the connecting rod cap C thereon has been conveyed to the gantry robot by the conveyance line L together with the pallet P1 which carries the cylinder block B thereon and is then stopped at a predetermined position by means of a stopper mechanism (not shown), the drive motor operates and the lift table 23 rises, whereby the pallet P2 is lifted and separated from the conveyance line L together with the pallet P1. On the other hand, when the drive motor operates in the opposite direction and the lift table 23 moves down, the pallets P1 and P2 are returned again onto the conveyance line L.

As shown in FIGS. 1 and 3, the block chucking unit 30 comprises a holding plate 31 having a generally rectangular profile, a fixed depending portion 32 fixed to the holding plate 31 and extending downward, a movable depending portion 33 supported movably in Y direction relative to the holding plate 31 and extending downward, a chuck 34 supported pivotably by the fixed depending portion 32, a chuck 35 supported pivotably by the movable depending portion 33, a drive motor 36 fixed to the movable depending portion 33 and adapted to exert a rotative driving force on the chuck 35, an actuator 37 which adjusts a relative distance between the fixed depending portion 32 and the movable depending portion 33. The movable depending portion 33 has an LM block 33a which is movable in Y direction along an LM guide connected to an LM rail 31a of the holding plate 31.

According to this construction, when the actuator 37 operates to pull the movable depending portion 33 toward the fixed depending portion 32, the chucks 34 and 35 cooperate with each other to chuck the cylinder block B. If the drive motor 36 rotates in this chucked state, the cylinder block B is rotated around a crank shaft S, whereby, for example, cylinder bores are oriented so as to face in Z direction.

As shown in FIGS. 1 and 3, the shaft rotating unit 40 comprises a drive motor 41 fixed to the fixed depending portion 32 and a connector portion 42 for connection between the drive motor 41 and the crank shaft S. Therefore, when the drive motor 41 rotates in a state in which the cylinder block B is chucked by the chucks 34 and 35, the crank shaft S rotates through the connector portion 42 and, for example, a crank pin corresponding to the cylinder bore into which the piston P is to be inserted is positioned vertically below the cylinder bore concerned As shown in FIG. 3, the block moving unit 50 comprises an LM block 51 fixed to an upper surface of the holding plate 31 and connected to the LM rails 14, a ball screw (lead screw) 52 disposed within the upper frame 11b, a connecting member 53 connected at one end to the ball screw 52 so as to be moved in Y direction with rotation of the ball screw 52, an opposite end of the connecting member 53 being connected to the holding plate 31, and a drive motor 54 for rotating the ball screw 52.

According to this construction, when the drive motor 54 rotates in one direction, the block chucking unit 30, i.e., the cylinder block B, is moved rightward in Y direction in FIG. 1 and is positioned to a desired position. Conversely, when the drive motor 54 rotates in the opposite direction, the block chucking unit 30, i.e., the cylinder block B, is moved leftward in Y direction in FIG. 1 and is positioned above the block lift unit 20.

The block lift unit 20, block chucking unit 30, shaft rotating unit 40, and block moving unit 50 constitute a block positioning means which causes the cylinder block B to move vertically and horizontally or rotate about the crank shaft S, whereby the piston P being brought to the position (piston P inserting position) for insertion thereof into the associated cylinder bore formed in the cylinder block B.

The piston P inserting position lies vertically below the position in which a camera (first camera) 164 in the cylinder bore position detecting unit 160 is installed. Using the camera 164, the cylinder bore position detecting unit 160 photographs an image of the cylinder bore concerned in the cylinder block B from this position and detects a planar position of the cylinder bore. The planar position data of the cylinder bore thus detected is sent to a controller.

Figure 4:
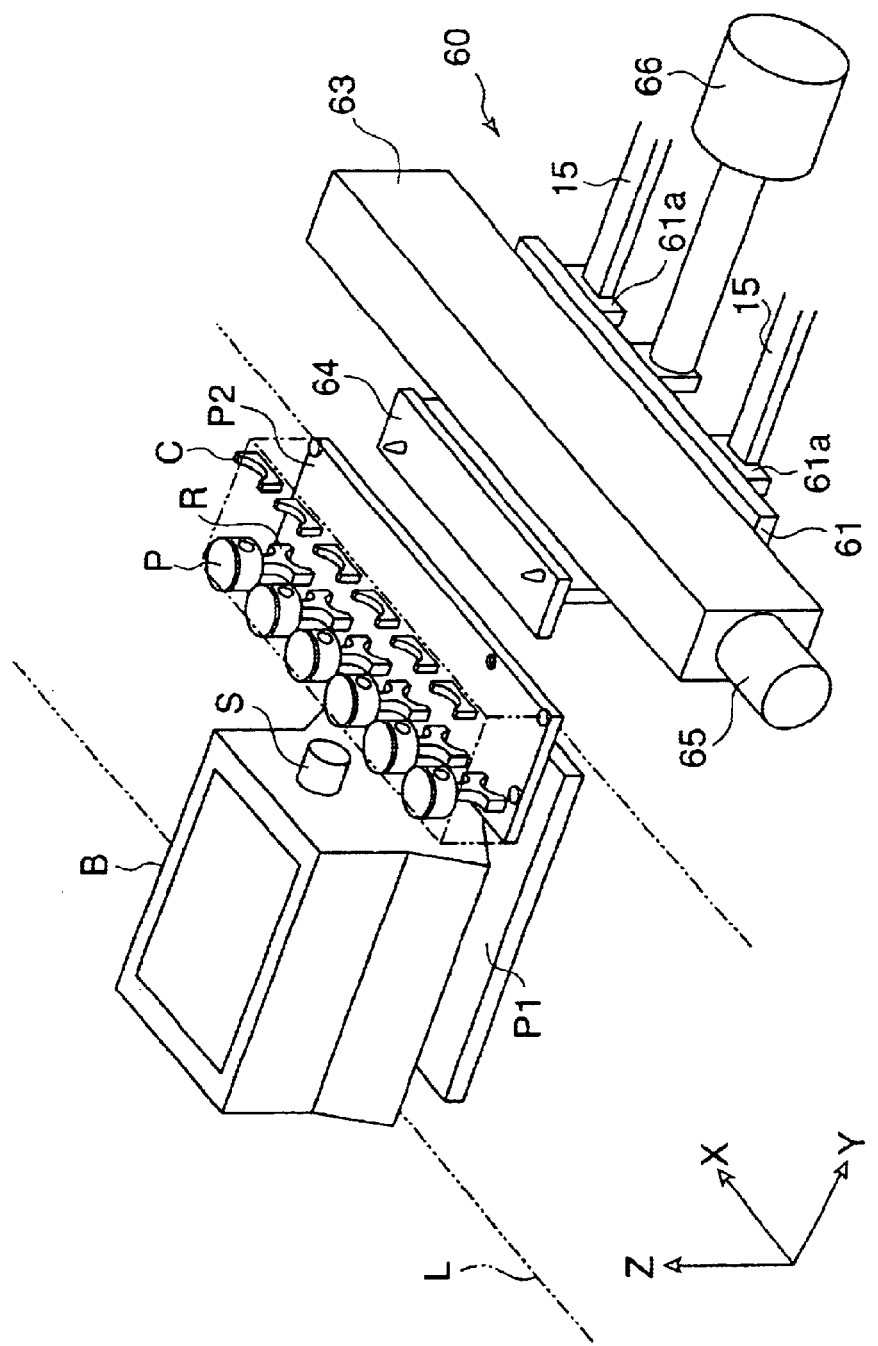
FIG. 4 is a perspective view showing a piston and connecting rod cap holding unit.

As shown in FIGS. 1 and 4, the holding unit 60 is disposed at a position adjacent to the conveyance line L and comprises a base 61, the base 61 being adapted to move horizontally (in Y direction) on the LM rails 15 provided on the fixed base 151 which spans the lower frames 12 (12a, 12b), an actuator 66 which causes the base 61 to move for positioning, a guide member 63 mounted on the base 61 and having a rail 63a (not shown) which extends in X direction, a movable holding portion 64 which is supported movably by means of the guide member 63 and can hold the pallet P2, and an actuator 65 which causes the movable holding portion 64 to move to a desired position in X direction for positioning.

After the lift table 23 has lifted the pallet 2 together with the pallet P1 and separated them from the conveyance line L, the holding unit 60, by operation of the actuator 66, moves leftward in FIG. 1 on the LM rails 15 and positions the movable holding portion 64 to below the pallet P2. Next, the lift table 23 descends, whereby the pallet P2 is rested on the movable holding portion 64. Then, the holding unit 60 moves rightward in FIG. 1 on the LM rails 15 and the actuator 65 operates, whereby the movable holding portion 64 is moved to a predetermined position in X direction, the piston P to be inserted into the cylinder bore is brought to a position where it is chucked by the piston chucking/inserting unit 70 and the connecting rod cap C to be mounted on the connecting rod R is brought to a position where it is chucked by the cap chucking unit 80, respectively.

The connecting rod R, which is provided with one bearing metal (not shown), is attached swingably to the piston P in advance, while the other bearing metal (not shown) and a clamping bolt CB are mounted beforehand to the connecting rod cap C.

As shown in FIGS. 1 and 5 to 7, the piston chucking/inserting unit 70 comprises a support portion 71 extending in Z direction, a movable arm 72 supported movably in Z direction relative to the support portion 71, an actuator 73 which causes the movable arm 72 to move to a desired vertical position (e.g., piston P chucking position, piston P-position detecting position, or piston P inserting position) and effects positioning thereof, and a piston chuck 70A attached to a lower end portion of the movable arm 72.

The piston chuck 70A comprises six chuck fingers 74, an actuator 75 which actuates the chuck fingers 74 so as to chuck and release the piston P, a detector 76, a pair of connecting rod chucking arms 77 for chucking the connecting rod R, and a piston push mechanism 110 for pushing the piston. The detector 76 (FIG. 6) measures a piston chucking position (closed position) of the chuck fingers 74 and then on the basis of the result of the measurement detects whether the piston ring has fallen off or not from a ring groove. The pair of connecting rod chucking arms 77 are moved toward and away from each other by operation of an actuator 78 to chuck and release the connecting rod R.

As each of the actuators 73, 75, and 78 there is used, for example, a drive motor and a lead screw, a pneumatic or hydraulic cylinder drive mechanism, or an electromagnetic drive mechanism.

When the movable arm 72 is moved down to a predetermined height by operation in one direction of the actuator 73, the chuck fingers 74 are positioned so as to surround the piston P rested on the pallet P2. Subsequently, the actuator 75 operates and the chuck fingers 74 chuck the piston P while pushing the piston ring into the ring groove. At this time, if the detector 76 detects dislodgment of the piston ring, the operation is once stopped, permitting the worker to perform a later adjustment work. Next, the actuator 78 operates and the pair of connecting rod chucking arms 77 chuck the connecting rod R. Thereafter, the actuator 73 operates in the opposite direction, whereby the movable arm 72 rises up to a predetermined height together with the piston P as chucked by the chuck fingers 74. Further, with operation of the moving unit 90, the piston chuck 70A and the piston P are positioned to a position (hereinafter referred to as the "start-point chuck position") above the piston position detecting unit 170 which detects a planar position of the piston P. The piston position detecting unit 170, using a camera 174 thereof, photographs an image of the piston P located at the said position and detects a planar position of the piston. Planar position data of the piston thus detected is sent to the controller.

Figure 8:
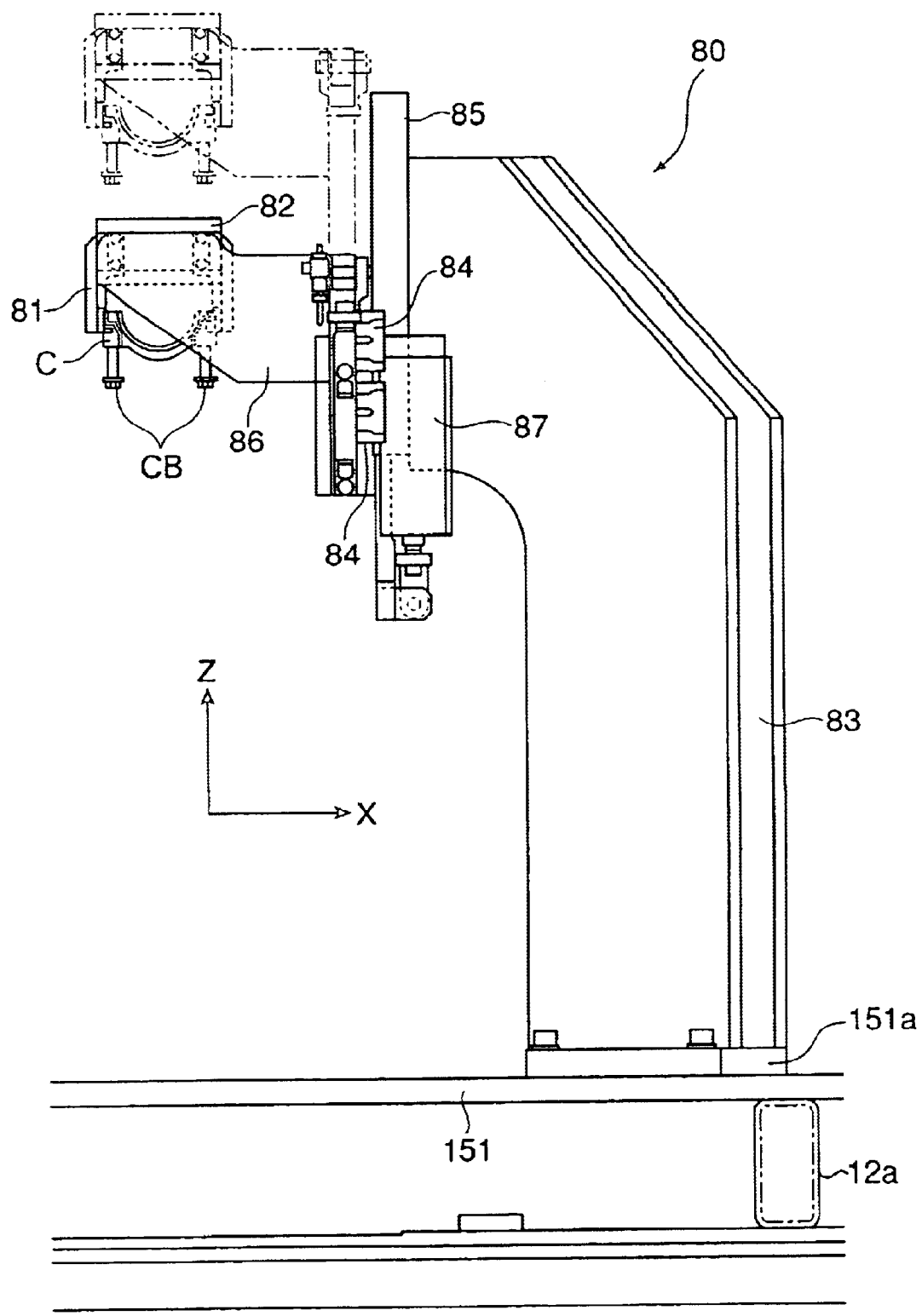
FIG. 8 is a side view of a cap chucking unit.

As shown in FIGS. 1 and 8, the cap chucking unit 80 comprises a base 151a, the base 151a being mounted on the fixed base 151 which spans the lower frames 12 (12a, 12b), a support portion 83 fixed onto the base 151a and extending vertically, a movable arm 86 supported vertically movably in Z direction by LM guide (LM block 84, LM rail 85) relative to the support portion 83, a pair of chuck pieces 81 installed on the movable arm 86 to chuck the connecting rod cap C, an actuator 87 for moving the movable arm 86 vertically, and an actuator 82 which actuates the pair of chuck pieces 81 toward and away from each other.

As each of the actuators 82 and 87 there is used, for example, a pneumatic or hydraulic cylinder mechanism or an electromagnetic drive mechanism.

According to this construction, when the actuator 87 as a constituent of the cap chucking unit 80 operates in one direction and causes the movable arm 86 to move down to a predetermined height, the pair of chuck pieces 81 are positioned on both sides of the connecting rod cap C which is placed on the pallet P2, followed by operation of the actuator 82, whereby the pair of chuck pieces 81 chuck the connecting rod cap C. Thereafter, the actuator 87 operates in the opposite direction, whereby the movable arm 86 moves upward to a predetermined height together with the chucked connecting rod cap C. Next, the holding unit 60 with the pallet P2 thereon moves leftward in Y direction in FIG. 1, then a movable base 121 of the moving unit 150 which will be described later is moved in the same direction, and the clamp unit 130 to be described later is positioned below the cap chucking unit 80. Next, the movable arm 86 moves down and delivers the chucked connecting rod cap C to a tip portion (cap support portion 133. See FIG. 11.) of the clamp unit 130. Thereafter, the movable arm 86 rises and then the movable base 121 is moved rightward in Y direction in FIG. 1.

Figure 5:
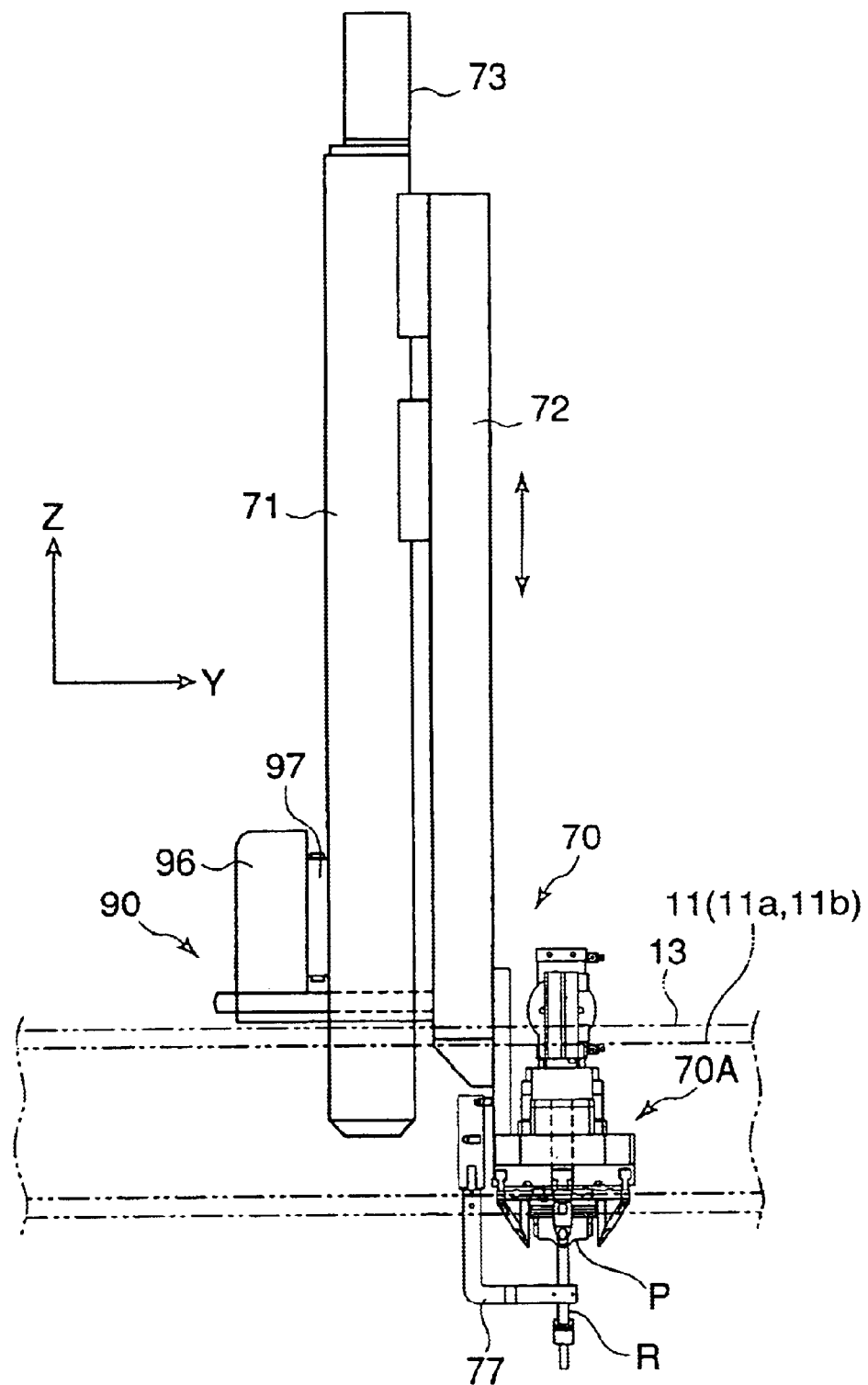
FIG. 5 is a front view showing a piston chucking/inserting unit.
Figure 6:
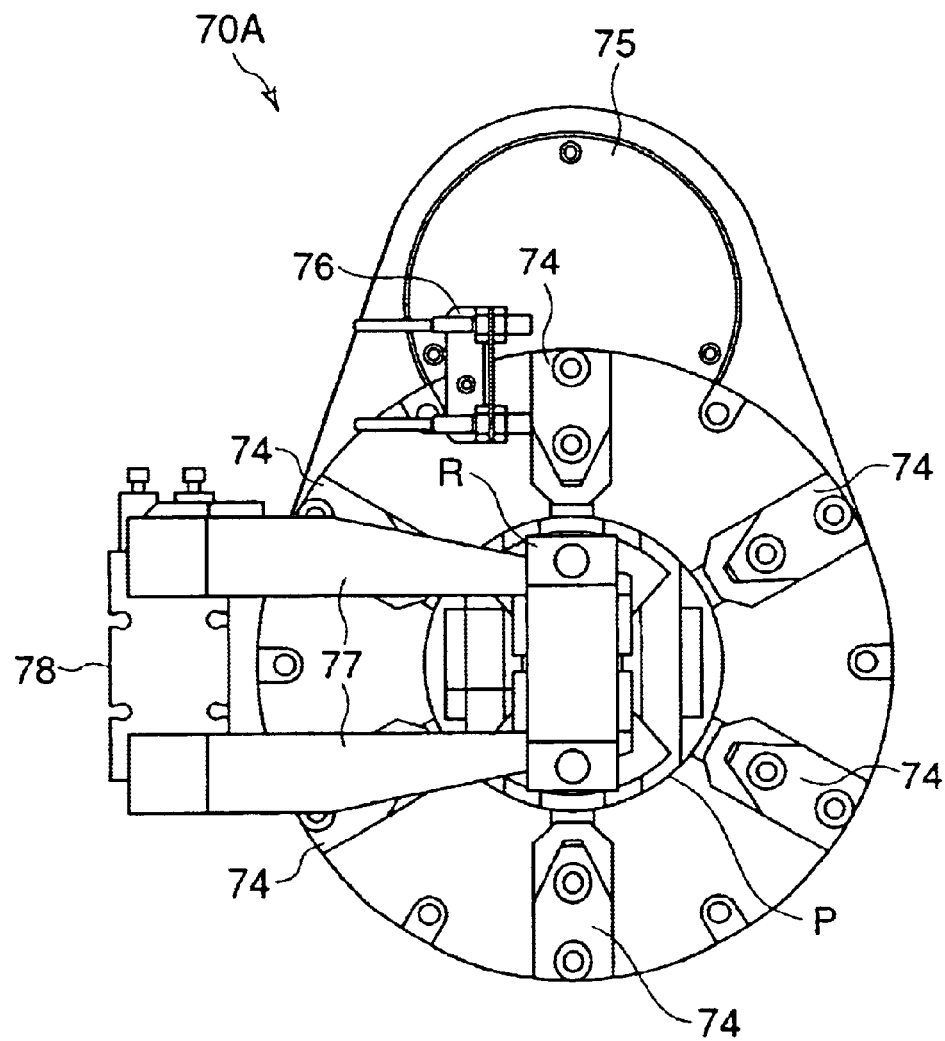
FIG. 6 is a partial enlarged view of the piston chucking/inserting unit, showing a bottom of a piston chuck portion.

As shown in FIGS. 1, 3(b) and 5, the moving unit 90 comprises a movable base 91 which spans the upper frames 11 (11a, 11b), LM rails (not shown) fixed to a bracket 96 of the movable base 91, a movable base 97 (a drive mechanism thereof comprises a ball screw and a drive motor) which is movable in X direction while holding the piston chucking/inserting unit 70, the movable base 97 having an LM block (not shown) connected slidably to the LM rails, an LM block 92 fixed to a lower surface of the movable base 91 and connected slidably to the LM rails 13, a ball screw 93 disposed within the upper frame 11a, a connecting member 94 connected at one end thereof to the ball screw 93 so as to be moved in Y direction with rotation of the ball screw and connected at an opposite end thereof to the movable base 91, and a drive motor 95 for rotating the ball screw 93.

According to this construction, when the drive motor 95 rotates in one direction, the piston chucking/inserting unit 70 and the piston P chucked by the chuck fingers 74 of the piston chucking/inserting unit 70 are moved rightward in Y direction in FIG. 1 through the connecting member 94 and are positioned to a desired position, while when the drive motor 95 rotates in the opposite direction, they are moved leftward in Y direction in FIG. 1 through the connecting member 94 and are positioned above the holding unit 60. Further, they are moved in X-Y direction and are positioned to a desired position, e.g., a position (the start-point chuck position) above the piston position detecting unit 170. Thus, by means of the moving unit 90, the piston chucking/inserting unit 70 and the piston P are moved in X-Y direction and are positioned to a desired position.

A piston positioning means is constituted by the holding unit 60, the piston chucking/inserting unit 70 and the moving unit 90.

The piston positioning means chucks the piston P on the pallet P2, causes it to move in X-Y-Z direction and positions it to the piston inserting position so that the piston P can be inserted into the cylinder bore of the cylinder block B which has been positioned by the block positioning means.

A cap positioning means is constituted by the holding unit 60, the cap chucking unit 80 and the moving unit 150.

For clamping the connecting rod cap C to the connecting rod R of the piston P which has been inserted into the cylinder bore of the cylinder block B, the cap positioning means chucks the connecting rod cap C on the pallet P2, moves it in X-Y-Z direction and positions it to a predetermined position (a position where it is supported by the cap support portion 133 of the clamp unit 130 to be described later), then delivers it to the cap support portion 133.

The push mechanism 110 comprises a push-in rod 113 incorporated in a central part of the piston chuck 70A which is positioned at a tip of the piston chucking/inserting unit 70, the push-in rod 113 being supported movably in Z direction and having at a lower end thereof a pressing portion 113a capable of coming into abutment against an upper surface of the piston P, and an actuator 114 which causes the push-in rod 113 (pressing portion 113a) to move down to a desired vertical position and performs positioning thereof. As the actuator 114 there is used, for example, a drive motor and a lead screw or a pneumatic or hydraulic cylinder drive mechanism.

The cylinder block B and the piston P are positioned beforehand to a predetermined position by the block moving unit 50 and the moving unit 90, respectively, then in this state the push-in rod 113 (pressing portion 113a) in the push mechanism 110 moves down and pushes the piston P into the cylinder bore, whereby the piston P inserting operation is performed.

Expansion of the piston ring to a greater extent than a predetermined width is prevented by inner peripheral faces of the piston chuck fingers 74, so that the piston ring is held within the ring groove while being abutted against the inner peripheral faces of the piston chuck fingers 74 without being disengaged from the ring groove.

A more detailed description will now be given of the piston P inserting operation. By operation of the actuator 114 in the push mechanism 110 the push-in rod 113 moves down and the pressing portion 113a pushes the piston P into the cylinder bore concerned while being abutted against the upper surface of the piston, whereby, coupled with the action of the connecting rod guide unit 120 to be described later, the piston P is inserted surely and smoothly into the cylinder bore. At the same time, with the piston inserting operation, the connecting rod R comes into abutment against the crank shaft S and a stopped position is detected, whereby the presence or absence of the bearing metal attached to the connecting rod R is detected. Further, by detecting a piston inserted depth it is possible to detect whether the piston has been caught or not in the cylinder bore halfway.

Figure 10:
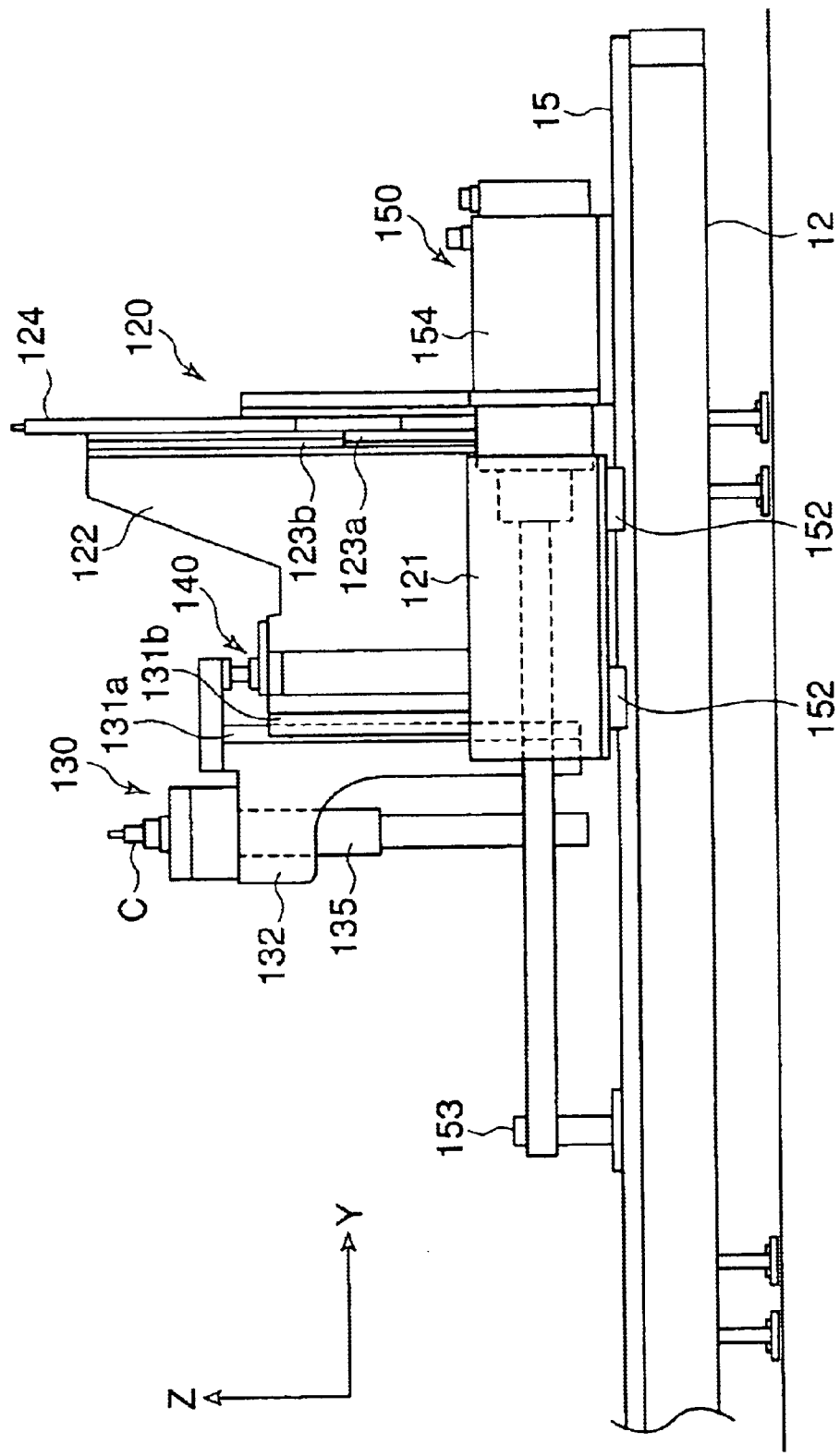
FIG. 10 is a front view showing the connecting rod guide unit, clamp unit, clamp/lift unit, and moving unit.

As shown in FIGS. 1, 9 and 10, the connecting rod guide unit 120 comprises a movable base 121 located in a lower area of the cylinder block B which has been positioned to the piston P inserting position, the movable base 121 being disposed movably in Y direction on the fixed base 151 which spans the lower frames 12 (12a, 12b), a support member 122 fixed to the movable base 121 and extending vertically, two guide rods 124 supported vertically movably in Z direction by LM guide (LM block 123a, LM rail 123b) relative to the support member 122, a movable rack 125 adapted to move integrally with the guide rods 124, a fixed rack 126 fixed to the support member 122, a gear 127 disposed rotatably between the movable rack 125 and the fixed rack 126 and meshing with the two, a movable member 128 which supports the gear 127 and which is movable in Z direction, and an actuator 129 which causes the movable member 128 to move vertically in Z direction and positions it to a predetermined position.

As the movable member 128 begins to rise from the state shown in FIG. 9 by operation of the actuator 129, the gear 127 turns counterclockwise and the movable rack 125, i.e., the guide rods 124 begin to rise. When the guide rods 124 rise up to a predetermined position, their tip portions 124a get into tapped holes R1 formed in the connecting rod R to inhibit the swing motion of the connecting rod R. At this time, the connecting rod R is released from the connecting rod chucking arms 77.

The piston P is pushed in (pushed down) by the push-in rod 113, then following this motion, the guide rods 124 move down while guiding the connecting rod R, whereby the swing motion of the connecting rod R is inhibited and hence it is possible to prevent contact of the connecting rod with the inner periphery surface of the cylinder bore.

For allowing the motion of the guide rods 124 to positively follow the descending motion of the piston P, the driving force of the actuator 129 is controlled by pneumatic pressure or hydraulic pressure or the like so as to make the movable member 128 descend without exerting a resisting force on that descending motion while preventing dislodgment of the guide rods 124 from the connecting rod R.

Figure 11B:
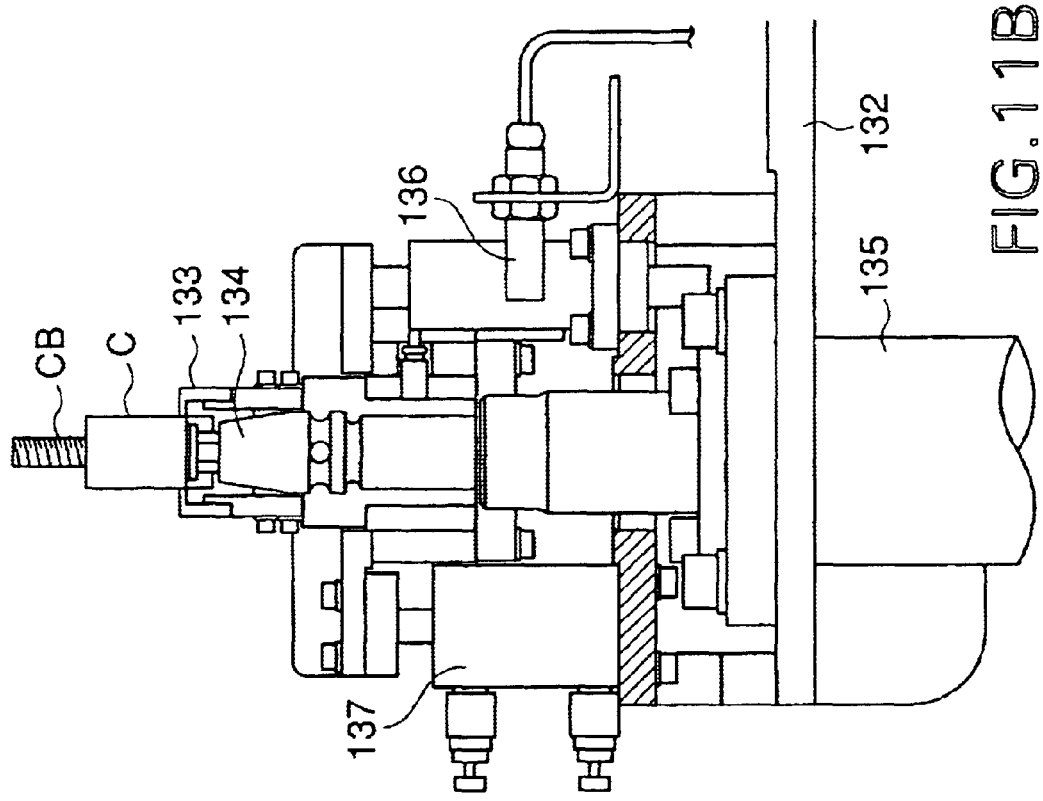
FIG. 11 is a partial enlarged view of the clamp unit, in which (a) is a side view and (b) is a front view.
Figure 11A:
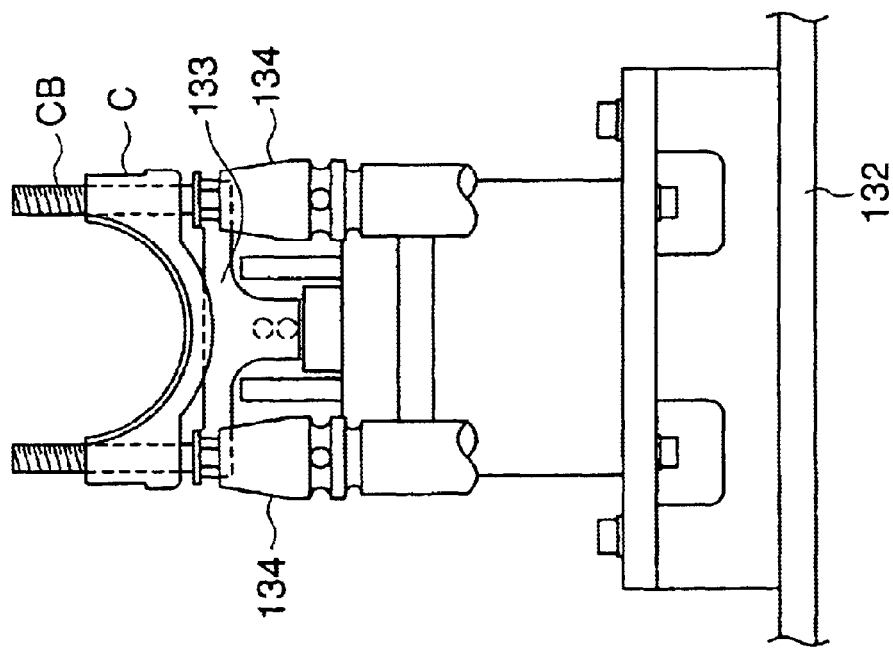

As shown in FIGS. 10 and 11, the clamp unit 130 and the clamp/lift unit 140 are provided on the movable base 121 and supported by the support member 122 in the connecting rod guide unit 120.

The clamp unit 130 comprises a movable frame 132 which is supported by the support member 122 so as to be movable in Z direction through LM guide (LM rail 131a, LM block 131b), a cap support portion 133 which is held by the movable frame 132 and which supports the connecting rod cap C, two clamp sockets 134 connected to the clamping bolts CB to exert a clamping force thereon, an actuator 135 for rotatively driving the clamp sockets 134, a sensor 136 for detecting whether a bearing metal is present or not on the connecting rod cap C, and an actuator (air cylinder) 137.

Prior to a clamping motion of the damping bolts CB, the cap support portion 133 is raised by operation of the actuator 137, allowing the connecting rod cap C to come into abutment against the crank shaft (crank pin) S, whereupon the rising motion of the cap support portion 133 stops. With ON or OFF of the sensor 136 at the position where the rising motion of the cap support portion 133 has stopped, the presence or absence of a bearing metal is detected. If the presence of a bearing metal is detected by the sensor 136, there is performed a clamping operation for the clamping bolts CB.

The clamp/lift unit 140 is constituted by an actuator which is connected at one end thereof to the support member 122 and at an opposite end thereof to the movable frame 132 and which causes the movable frame 132 to move in Z direction and performs positioning thereof. As this actuator there is used, for example, a drive motor and a lead screw, a pneumatic or hydraulic cylinder drive mechanism, or an electromagnetic drive mechanism.

As shown in FIGS. 1, 9 and 10, the moving unit 150 comprises the fixed base 151 which spans the lower frames 12 (12a, 12b), LM rails 15 fixed to an upper surface of the fixed base 151 and extending in Y direction, LM blocks 152 fixed to a lower surface of the movable base 121 and connected slidably to the LM rails 15, and an actuator 154 which is provided on the fixed base 151 and acts to move the movable base 121 in Y direction between a position close to the actuator 154 and a connecting member 153 mounted on the fixed base 151 and position the movable base 121 to a predetermined position. As the actuator 154 there is used, for example, a drive motor and a lead screw, a pneumatic or hydraulic cylinder drive mechanism, or an electromagnetic drive mechanism.

The movable base 121 moves in Y direction by operation of the actuator 154, whereby the connecting rod guide unit 120, the damp unit 130 and the clamp/lift unit 140 are moved together in Y direction and are positioned to predetermined positions. More specifically, when the connecting rod guide unit 120 guides the connecting rod R, the movable base 121 is moved leftward in Y direction in FIG. 1 and the connecting rod guide unit 120 is positioned below the cylinder bore concerned in the cylinder block B which has been positioned to the piston P inserting position. On the other hand, after the insertion of the piston P has been completed and when the clamp unit 130 clamps the connecting rod cap C, the movable base 121 is moved rightward in Y direction in FIG. 1 and the clamp unit 130 is positioned below the cylinder bore in the cylinder block B which has been positioned to the piston P inserting position.

Thus, the moving unit 150 serves as both a moving unit which causes the connecting rod guide unit 120 to move in Y direction and positions it to a predetermined position and a moving unit which causes both clamp unit 130 and clamp/lift unit 140 to move in Y direction and positions them to predetermined positions. By thus using a single moving unit in common it is possible to simplify the structure.

A clamp means for clamping the connecting rod cap C to the connecting rod R is constituted by the clamp unit 130, the damp/lift unit 140 and the moving unit 150.

As shown in FIGS. 1 and 2, the cylinder bore position detecting unit 160 comprises a support portion 162 fixed onto a fixed base 161 which spans the upper frames 11 (11a, 11b), the support portion 162 extending vertically, a lighting device (lamp) 163 attached to the support portion 162 through a bracket, and a camera (first camera) 164 attached to the support portion 162 through a bracket and positioned just above the lighting device 163. The cylinder bore position detecting unit 160 photographs an image of the cylinder bore concerned in the cylinder block B which has been positioned to the piston inserting position by the block positioning means, then calculates central position coordinates Q1 (X1, Y1) of the cylinder bore on the basis of the image data, and sends the result of the calculation to a main controller in the automatic piston inserting equipment.

As shown in FIGS. 1 and 2, the piston position detecting unit 170 comprises a support portion 172 fixed to the fixed base 151 which spans the lower frames 12 (12a, 12b), the support portion 172 extending vertically, a lighting device (lamp) 173 attached to the support portion 172 through a bracket, and a camera (second camera) 174 attached to the support portion 172 through a bracket and positioned just under the lighting device 173. The piston position detecting unit 170 photographs an image of the piston P which has been chucked at a predetermined height by the piston chucking/inserting unit 70 and which has been positioned (start-point chuck position) just above the camera 174 by the moving unit 90, then calculates central position coordinates Q2 (X2, Y2) of the piston P on the basis of the image data, and sends the result of the calculation to the main controller in the automatic piston inserting equipment.

On the basis of the central position coordinates Q1 (X1, Y1) of the cylinder bore provided from the cylinder bore position detecting unit 160 and the central position coordinates Q2 (X2, Y2) of the piston P provided from the piston position detecting unit 170, the main controller in the automatic piston inserting equipment calculates a movement quantity (distance Q1Q2 and direction θ) for the insertion of the piston P into the cylinder bore, then on the basis of the movement quantity, issues commands to the drive motor 95 which is interlockedly connected to the movable base 91 in the moving unit 90 and also to the drive mechanism (not shown) which is interlockedly connected to the movable base 97 in the moving unit 90 so that the moving unit 90 moves the piston P to the piston inserting position, wherein:

$$Q1Q2=[(Y2-Y1)^2+(X2-X1)^2]^{1/2}$$

$$\theta=\tan^{-1}[(Y2-Y1)/(X2-X1)]$$

A vision system is constituted by the cylinder bore position detecting unit 160, the piston position detecting unit 170 and the main controller in the automatic piston inserting equipment.

Next, the operation of the whole of the automatic piston inserting equipment will be described below in detail with reference to FIGS. 12 to 15.

Figure 12A:
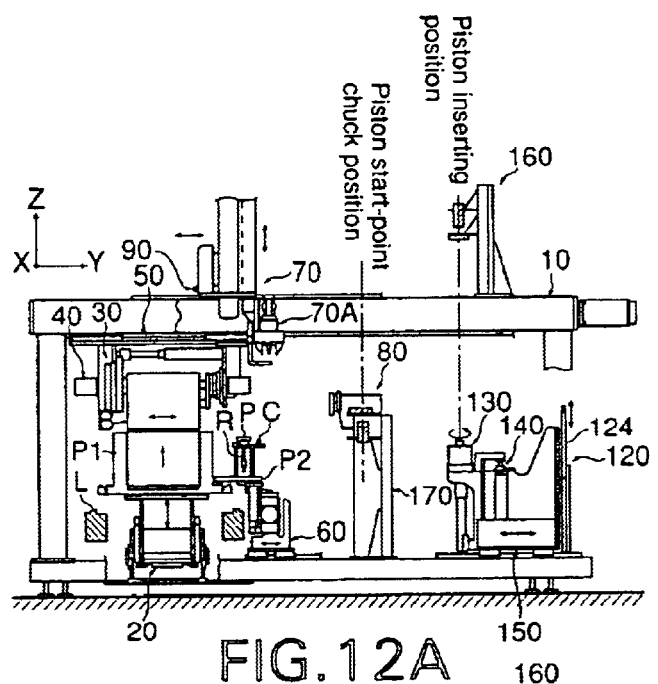
FIGS. 12(a), (b) and (c) are state diagrams showing operations of the automatic piston inserting equipment.

First, as shown in FIG. 12(a), the pallet P1 which has been conveyed by the conveyance line L is stopped at the position of the block lift unit 20 and is lifted and separated from the conveyance line L by the block lift unit 20. On the other hand, the pallet P2 which has been conveyed together with the pallet P1 by the conveyance line L is stopped at a sideway position of the holding unit 60 and is lifted and separated from the conveyance line L by the block lift unit 20. Thereafter, the holding unit 60 is moved leftward (leftward in Y direction in FIG. 12(a)) and is positioned and stopped below the pallet P2.

Figure 12B:
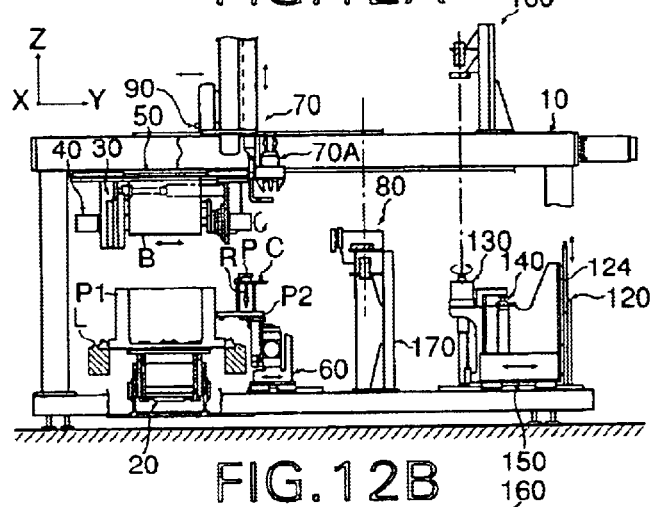

Subsequently, as shown in FIG. 12(b), the block chucking unit 30 chucks the cylinder block B and the block lift unit 20 descends. Then, the block chucking unit 30 causes the cylinder block B to rotate about the crank shaft S and orients it so that the cylinder bore for insertion therein of the piston P faces vertically upward. At the same time, the shaft rotating unit 40 rotates the crank shaft S into a stand-by state permitting insertion of the piston P. Further, with the descent of the block lift unit 20, the pallet P2 is delivered to the holding unit 60 which has been positioned below the pallet P2.

Figure 12C:
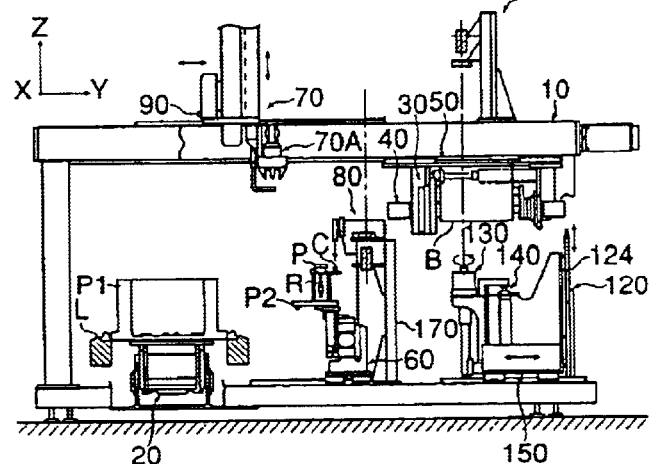

Thereafter, as shown in FIG. 12(c), the block chucking unit 30 which chucks the cylinder block B is moved rightward (rightward in Y direction in FIG. 12(c)) by the block moving unit 50 and is positioned to the piston inserting position lying below the cylinder bore position detecting unit 160 which detects a planar position of the cylinder bore concerned in the cylinder block B. The cylinder bore position detecting unit 160 photographs an image of the predetermined cylinder bore and then on the basis of the image data obtained detects a planar central position Q (X1, Y1) of the cylinder bore.

Subsequently, the holding unit 60 moves in X-Y direction and the cap chucking unit 80 is positioned just above the pallet P2 with descent of the movable arm 86 and its pair of chuck pieces 81 chuck a predetermined connecting rod cap C.

Figure 13A:
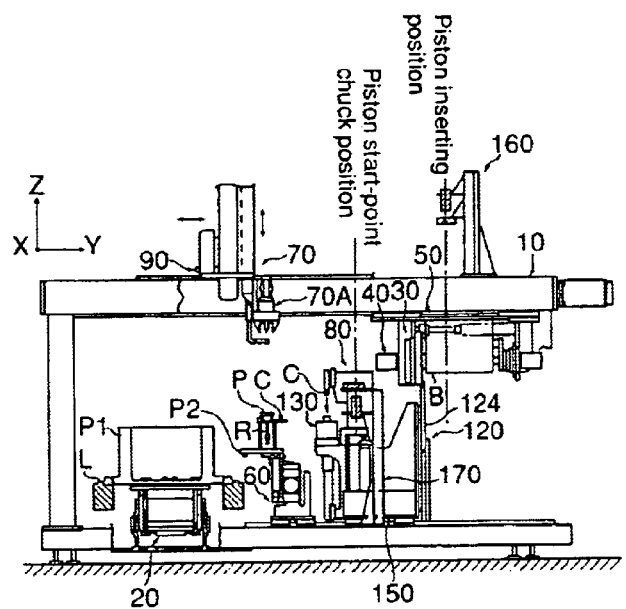
FIGS. 13(a), (b) and (c) are state diagrams showing operations of the automatic piston inserting equipment.

Then, as shown in FIG. 13(a), the cap chucking unit 80 is raised in Z direction, and after the holding unit 60 has moved leftward to below the piston chuck 70A, the moving unit 150 moves to below the cap chucking unit 80. Next, the cap chucking unit 80 descends and transfers the connecting rod cap C onto the cap support portion 133 of the clamp unit 130.

Figure 13B:
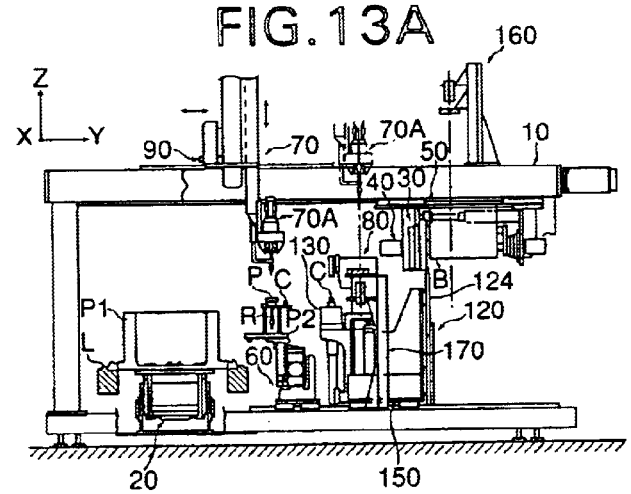

Subsequently, as shown in FIG. 13(b), the piston chucking/inserting unit 70 operates, the piston chuck 70A descends, and the chuck fingers 74 chuck a predetermined piston P on the pallet P2.

Then, the piston chuck 70A ascends, and by operation of the moving unit 90 the piston P chucked by the piston chucking/inserting unit 70 is positioned (start-point chuck position) above the piston position detecting unit 170 which detects a planar position of the piston P. The piston position detecting unit 170 photographs an image of the piston P from below the piston and detects a planar central position Q2 (X2, Y2) of the piston on the basis of the image data obtained.

Figure 13C:
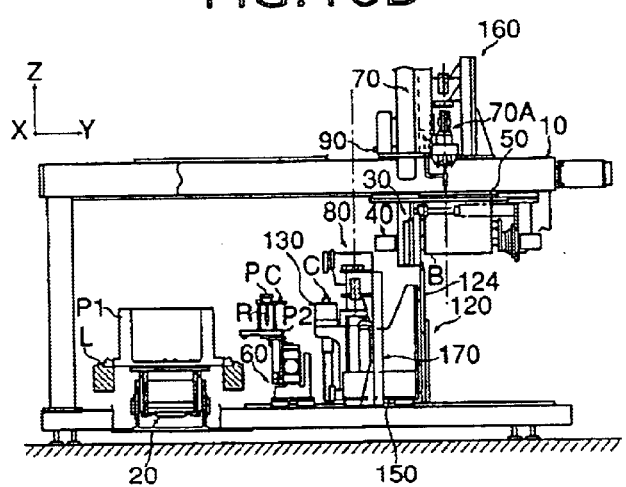

Subsequently, as shown in FIG. 13(c), on the basis of distance and direction between the two central positions Q1 (X1, Y1) and Q2 (X2, Y2) obtained by calculation from those two central positions, the piston chucking/inserting unit 70, while chucking the piston P, is moved a predetermined quantity in X-Y direction by operation of the moving unit 90 and the piston P is positioned above the cylinder bore in the cylinder block B into which the piston is to be inserted.

The "start-point chuck position" indicates a position serving as a start point from which the piston chucking/inserting unit 70 is thus moved a predetermined quantity while chucking the piston P.

Figure 14A:
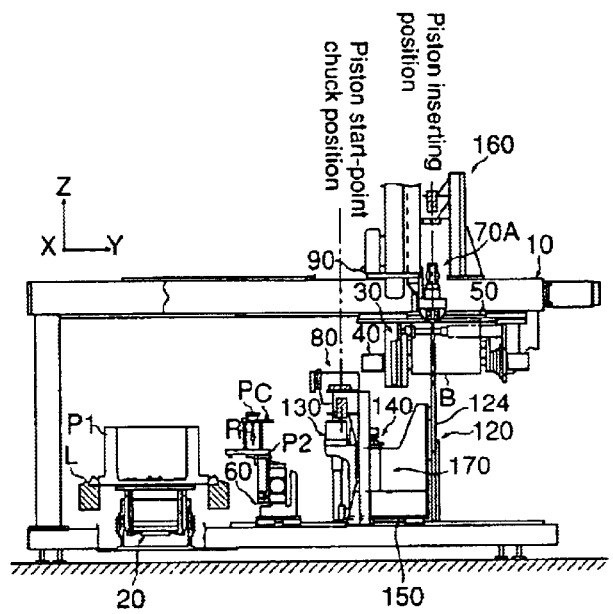
FIGS. 14(a), (b) and (c) are state diagrams showing operations of the automatic piston inserting equipment.

Then, as shown in FIG. 14(a), the piston chucking/inserting unit 70, while chucking the piston P, descends to a position above and near the cylinder bore into which the piston P is to be inserted. Further, the moving unit 150 moves to below the cylinder block B, the connecting rod guide unit 120 operates, and the guide rods 124 rise up to a predetermined position through the interior of the cylinder bore.

At this time, the tip portions 124a of the guide rods 124 get into the tapped holes R1 of the connecting rod R and the connecting rod is unchucked from the connecting rod chucking arm 77.

Figure 14B:
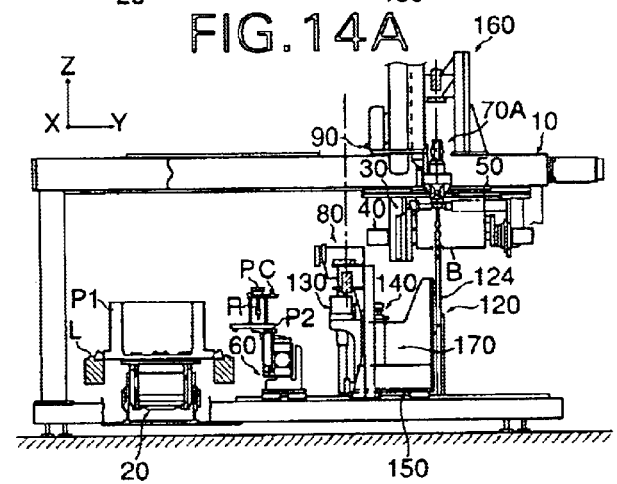

Thereafter, as shown in FIG. 14(b), the push-in rod 113 in the push mechanism 110 which is incorporated in the piston chuck 70A operates and pushes (brings down) the piston P into the cylinder bore. At the same time, the guide rods 124 descend while guiding the connecting rod R. When the connecting rod R abuts the crank pin of the crank shaft S, the insertion of the piston P is completed.

While the piston P and the connecting rod R descend through the interior of the cylinder bore, the connecting rod is guided by the guide rods 124 to inhibit its swing motion and thus the collision thereof with the inner periphery surface of the cylinder bore is prevented. The guide rods 124 descend following the descent of the piston P and the connecting rod R through the interior of the cylinder bore without making any resistance thereto.

Figure 14C:
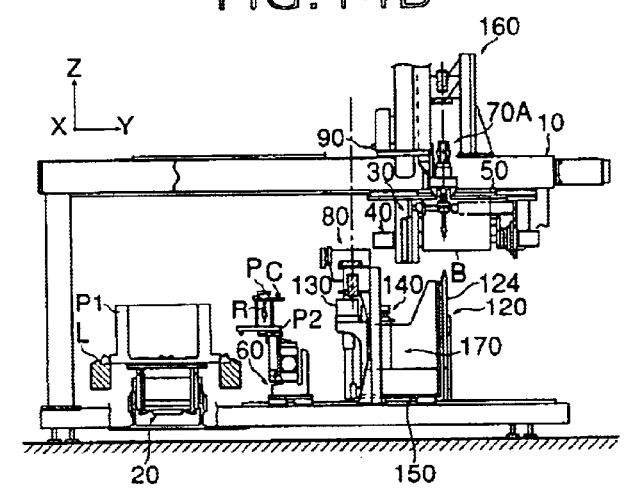

Next, as shown in FIG. 14(c), the connecting rod guide unit 120 brings down the guide rods 124, leaves the connecting rod R and returns to its stand-by position.

Figure 15A:
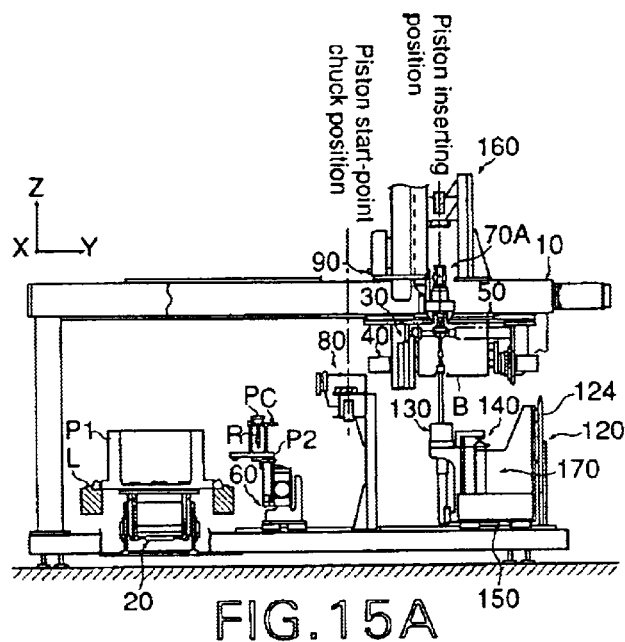
FIGS. 15(a), (b) and (c) are state diagrams showing operations of the automatic piston inserting equipment.

Subsequently, as shown in FIG. 15(a), by operation of the moving unit 150 the clamp unit 130 is moved rightward and is positioned to the position for clamping the connecting rod cap C to the connecting rod R.

Further, by operation of the clamp/lift unit 140 the connecting rod cap C is lifted to the position where it confronts the connecting rod R, then with the crank pin embraced by both connecting rod cap C and the connecting rod R, the clamping bolts CB are threaded into the connecting rod R and the connecting rod cap C is clamped to the connecting rod R by the clamp unit 130 (clamp socket 134 and actuator 135). Now, the mounting of one piston P to the cylinder block B is completed.

During this clamping operation, the push-in rod 113 pushes the piston P from above, ensuring positioning of the piston.

Figure 15B:
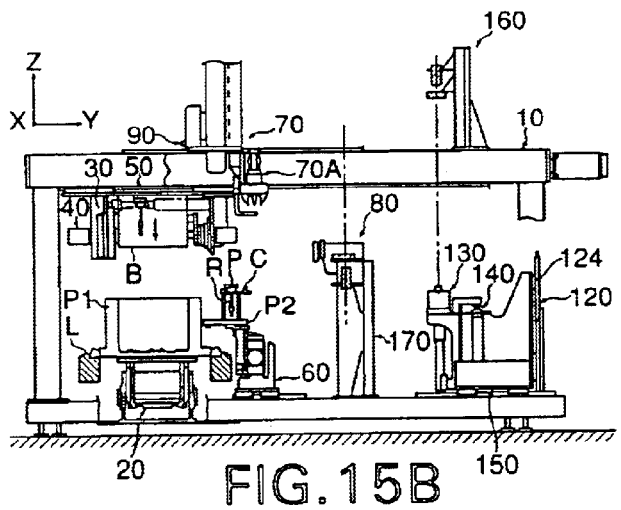

Next, as shown in FIG. 15(b), the clamp unit 130 descends and returns to its stand-by position by operation of the clamp/lift unit 140. The push-in rod 113 retracts and the piston chucking/inserting unit 70 rises, then is moved leftward by the moving unit 90 and returns to its stand-by position.

For mounting another piston P, with the block chucking unit 30 positioned to the piston inserting position, the above series of operations illustrated in FIGS. 12(b) to 15(b) are repeated.

When the mounting of all the pistons is over, the block chucking unit 30 is moved leftward by the moving unit 50 and returns to its stand-by position above the block lift unit 20, as shown in FIG. 15(b). The holding unit 60 which carries the pallet P2 thereon is also moved leftward by the moving unit including the actuator 66) and returns to its stand-by position for the delivery of pallet P2 which position lies on the right-hand side of the block lift unit 20.

Figure 15C:
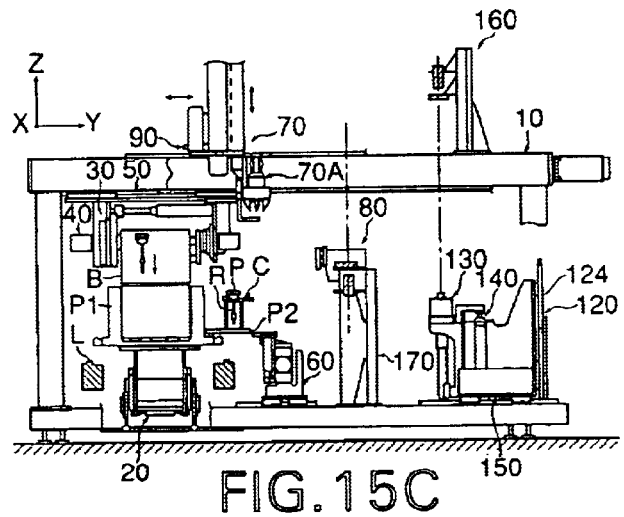
Figure 16A:
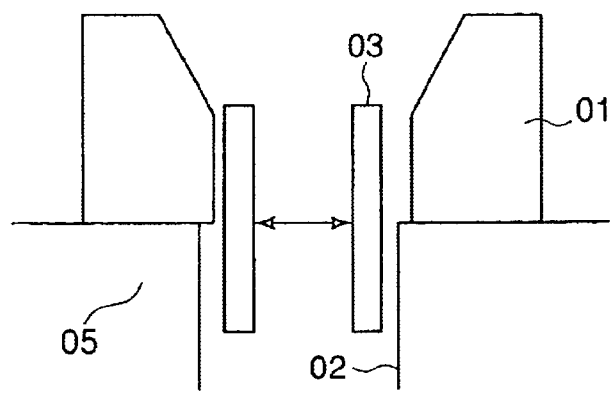
FIGS. 16(a), (b) and (c) illustrate a series of working steps for inserting a to-be-inserted object into an insertion bore with use of a conventional insertion jig.
Figure 16B:
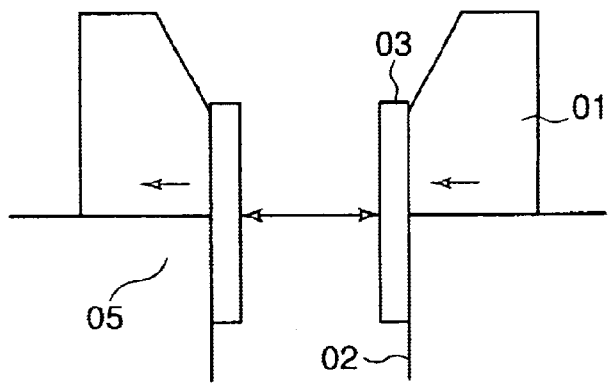
Figure 16C:
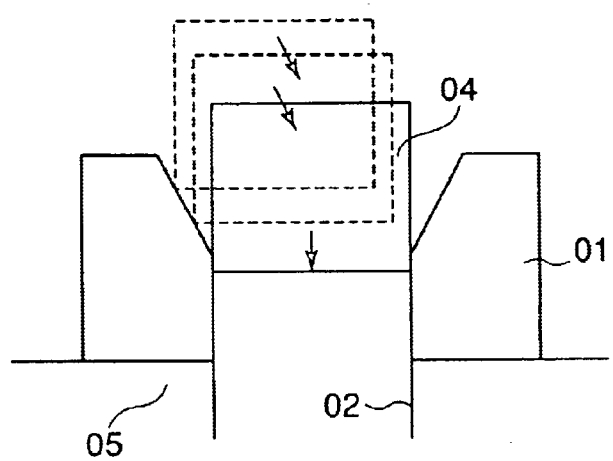

Then, as shown in FIG. 15(c), the block chucking unit 30 orients the cylinder block B in a predetermined direction and transfers the cylinder block B onto the pallet P1 lying on the block lift unit 20 which has been raised. Further, with rise of the block lift unit 20, the pallet P1 receives the pallet P2 from the holding unit 60 which has returned to its delivery standby position. Thereafter, the holding unit 60 moves rightward and retreats to a position not obstructing the descent of the pallet P2. The block lift unit 20 descends and returns the pallet P1 with both cylinder block B and pallet P2 carried thereon to the conveyance line L. As a result, the cylinder block B with the piston P mounted thereto is conveyed to the downstream side by the conveyance line L.

Although in this embodiment all of the pistons P are mounted by a single automatic piston inserting equipment, plural such automatic piston inserting equipments may be arranged for the conveyance line L to share the piston P mounting operation, whereby the productivity can be improved.

Since the automatic piston inserting equipment using a vision system according to this embodiment is constructed as above, there can be attained the following effects.

Using the vision system, a central position of the cylinder bore concerned in the cylinder block B which has been positioned to the piston inserting position by the block positioning means and a central position of the piston P which has been positioned to the start-point chuck position are detected, then a movement quantity for insertion of the piston P into the cylinder bore is calculated, and a movement quantity of the piston positioning means from the start-point chuck position of the piston P to the position of the cylinder bore, i.e., the piston inserting position, is determined. Therefore, even if there are variations in the positioning accuracy of the cylinder block B, that of the piston assembly (an assembly of piston P, piston ring, and connecting rod R), or in the dimensional accuracy of the work itself, the automatic piston inserting equipment corrects the position of the cylinder bore and that of the piston P automatically, so that it becomes possible to effect a highly accurate and positive insertion of the piston P into the associated cylinder bore.

Moreover, by the adoption of the vision system, it becomes no longer necessary to separately provide any of a piston inserting jig unit, a jig floating means, a jig alignment means, and a jig size switching means, nor is it necessary to provide jigs corresponding to various piston sizes, thus permitting the reduction of cost.

Further, since all the mounting works for the piston P and connecting rod cap C can be done automatically by the adoption of the block positioning means, piston positioning means, piston/connecting rod inserting means (push mechanism 110 and connecting rod guide unit 120), cap positioning means, clamp means, and vision system, it is possible to omit manual operations by workers and hence possible to greatly improve the productivity in engine assembly.

Further, all of the block chucking unit 30 as a constituent of the block positioning means, the cap chucking unit 80 as a constituent of the cap positioning means, the connecting rod guide unit 120 as a constituent of the piston/connecting rod inserting means, and the clamp unit 130 as a constituent of the damp means, perform either a one-dimensional movement in only Y or Z direction or a two-dimensional movement in Y and Z directions, so the respective positioning, etc.

become higher in accuracy and the piston P and the connecting rod cap C can be mounted with a higher accuracy to the cylinder block B.

Further, since all the cylinder bores formed in the cylinder block B can be oriented in the piston P inserting direction, the piston and connecting rod cap C can be mounted automatically even to plural different types of engines, including not only in-line type engines but also V-shaped engines.

In the piston positioning means, the holding unit 60 separates from the conveyance line L the piston P and the connecting rod cap C which have been conveyed by the conveyance line L, and positions them to a predetermined position in the horizontal direction, then the piston chucking/inserting unit 70 chucks the piston P lying in the predetermined position and positions it to a predetermined position in the vertical direction, further, the moving unit 90 causes the piston chucking/inserting unit 70 to move a predetermined quantity in the horizontal direction, allows the vision system to photograph an image of the piston P, then causes the piston chucking/inserting unit 70 to move horizontally by a movement quantity determined by calculation in the vision system, and positions it to a predetermined position (piston inserting position) within the work area. Thus, since the piston P holding work, the piston P chucking work, and the positioning work for positioning the piston P to the predetermined positions, are done by the respective units, a series of operations are carried out highly accurately and smoothly.

In the piston chucking/inserting unit 70 as a constituent of the piston positioning means, since the inside faces of the three or more, plural chuck fingers 74 arranged spacedly in the circumferential direction serve as chuck faces for chucking the piston P, a piston ring compressing function is obtained at the same time. Besides, the outside faces of the three or more, plural chuck fingers 74 are generally conical, which shape is suitable for contact with a chamfered portion usually formed at the inlet of each cylinder bore, so that when the piston P is inserted into the associated cylinder bore, it is possible to guide the piston P toward the cylinder bore and effect the insertion thereof smoothly.

Further, since the insertion of the piston P into the associated cylinder bore is performed by the push mechanism 110 which is incorporated in the piston chuck 70A attached to the lower end of the piston chucking/inserting unit 70, it is not necessary to separately provide a push mechanism and the construction of the automatic piston inserting equipment is so much simplified. Besides, the piston P can be inserted in an aligned state into the cylinder bore in a short time with a high working efficiency, whereby the productivity in engine assembly can be improved to a greater extent.

Moreover, in the piston chuck 70A of the piston chucking/inserting unit 70, the three or more, plural chuck fingers 74 are movable radially forward and backward, so by adjusting the movement of the chuck fingers 74 radially forward or backward in accordance with the size of the piston P concerned within the stroke of the fingers, it is made possible to chuck various sizes of pistons P without reconstruction and a procedure changing work. Thus, it is possible to afford an automatic piston inserting equipment suitable for a multi-variety mixed production line in engine assembly.

Although an example of work sequence using various units has been shown in this embodiment, there is made no limitation thereto, but there may be adopted other work sequences.

Although in this embodiment the movements of such units as the block chucking unit 30, cap chucking unit 80, connecting rod guide unit 120, and clamp unit 130 are limited to either one-dimensional movements in only Y or Z direction or two-dimensional movements in Y and Z directions, no limitation is made thereto, but they may be rendered further movable in X direction.

Moreover, if the piston chuck portion 70A attached to the lower end of the piston chucking/inserting unit 70 and provided with six chuck fingers 74 is provided with an inverting mechanism, it becomes possible to effect the insertion of piston not only vertically but also horizontally. Further, if an NC rotary shaft is added to the piston chuck portion 70A, it becomes possible to read the position in the rotational direction of the piston P by means of a vision system (camera), then correct the rotational position of the piston P and insert the piston thus corrected its rotational position into the cylinder bore.

Various charges may be made within the scope not departing from the gist of the present invention.

Further, the present invention is applicable not only to the insertion of piston but also to the insertion of other engine parts requiring a highly accurate alignment such as the insertion of cylinder head valves.

What is claimed is:

1. An automatic piston inserting apparatus using a vision system for inserting a piston with a connecting rod into a cylinder bore formed in a cylinder block provided with a crank shaft, clamping a connecting rod cap to the connecting rod and connecting the piston to the crank shaft, said automatic piston inserting apparatus comprising:

block positioning means for moving said cylinder block in both vertical and horizontal directions or rotating said cylinder block around said crank shaft to position the cylinder block in a predetermined position;

piston positioning means for positioning said piston for insertion thereof vertically from above into the cylinder bore formed in the cylinder block positioned by said block positioning means;

cap positioning means for positioning said connecting rod cap for clamping vertically from below to the connecting rod of said piston inserted into said cylinder bore;

clamp means for clamping said connecting rod cap vertically from below to said connecting rod; and a vision system, wherein said vision system photographs an image of said cylinder bore formed in the cylinder block positioned by said block positioning means and an image of said piston at a start-point chuck position, calculates central position coordinates of said cylinder bore and central position coordinates of said piston from image data obtained, and calculates from both said central position coordinates an increment of movement of said piston for insertion thereof into said cylinder bore, and on the basis of said increment of movement thus calculated, said piston positioning means moves said piston to a piston inserting position.

2. An automatic piston inserting apparatus using a vision system according to claim 1, wherein said piston positioning means includes:

a holding unit which holds said piston and said connecting rod cap, both having been conveyed by a conveyance line which moves horizontally for positioning;

a piston chucking/inserting unit which chucks said piston held by said holding unit and moves it vertically; and a moving unit which moves said piston chucking/inserting unit a predetermined distance horizontally, allows said vision system to photograph an image of said piston, then moves said piston chucking/inserting unit horizontally by only said increment of movement determined by calculation in said vision system, and positions it at a predetermined position within a work area.

3. An automatic piston inserting apparatus using a vision system according to claim 2, wherein said piston chucking/inserting unit has three or more chuck fingers, said chuck fingers being circumferentially spaced and radially movable forward and backward, inside faces of said chuck fingers being formed as chuck faces for chucking said piston, outside faces of said chuck fingers being inwardly tapered, at least at respective tip portions, for contacting an inlet of said cylinder bore, and wherein said piston chucking/inserting unit further has a push mechanism for pushing said piston toward said cylinder bore.

* * * * *

UNITED STATES PATENT AND TRADEMARK OFFICE
CERTIFICATE OF CORRECTION

PATENT NO. : 6,941,645 B2
DATED : September 13, 2005
INVENTOR(S) : Kosuge et al.

It is certified that error appears in the above-identified patent and that said Letters Patent is hereby corrected as shown below:

Title page,
Insert Item -- [30]    Foreign Application Priority Data
      March 15, 2000        Japan ................... 2000-117153
      Feb. 16, 2001         Japan ................... 2001-040832 --.

Signed and Sealed this

Tenth Day of January, 2006

JON W. DUDAS
*Director of the United States Patent and Trademark Office*